US012744860B1

(12) United States Patent
Hellmann et al.

(10) Patent No.: US 12,744,860 B1
(45) Date of Patent: Sep. 22, 2026

(54) DYNAMIC LAYOUTS OF VIDEO CONFERENCING PARTICIPANTS

(71) Applicant: Zoom Video Communications, Inc., San Jose, CA (US)

(72) Inventors: Ashley Alexandra Hellmann, San Francisco, CA (US); Cynthia Eshiuan Lee, Austin, TX (US); Robert Allen Ryskamp, Mountain View, CA (US); Jeffrey William Smith, Layton, UT (US); Tingyu Xie, Austin, TX (US); Matthew Brandon Wesson, Lafayette, CO (US)

(73) Assignee: Zoom Communications, Inc., San Jose, CA (US)

( * ) Notice: Subject to any disclaimer, the term of this patent is extended or adjusted under 35 U.S.C. 154(b) by 260 days.

(21) Appl. No.: 18/138,335

(22) Filed: Apr. 24, 2023

(51) Int. Cl.
*H04N 5/262* (2006.01)

(52) U.S. Cl.
CPC ................................ *H04N 5/2624* (2013.01)

(58) Field of Classification Search
CPC .... H04N 5/2624; H04M 3/563; H04M 3/567; G06F 3/0482; G06F 3/04845; G06T 11/00; G06V 20/41; G06V 20/46
USPC ......... 348/14.12, 14.03, 14.02, 14.08, 14.09, 348/14.1, 14.77, 14.78
See application file for complete search history.

(56) References Cited

U.S. PATENT DOCUMENTS 9,628,629 B1 * 4/2017 Kirkpatrick ........... H04M 3/565
11,915,483 B1 * 2/2024 Allen ..................... H04N 7/147
2009/0210789 A1 * 8/2009 Thakkar ............. H04N 21/4788 715/753
2018/0095635 A1 * 4/2018 Valdivia ............. G02B 27/0093
2018/0150433 A1 * 5/2018 Sowden ................ G06F 3/0481
2020/0211544 A1 * 7/2020 Mikhailov .............. G10L 15/22
2021/0326128 A1 * 10/2021 Malladi ............. H04L 12/40006
2023/0006851 A1 * 1/2023 Chou ..................... G06F 16/739
2023/0082335 A1 * 3/2023 Kambara ............ H04L 12/1822 709/204
2024/0146779 A1 * 5/2024 Ayanoglu ............. H04N 5/2624

FOREIGN PATENT DOCUMENTS

CN 117616738 A * 2/2024 ......... H04L 12/1822
WO WO-2018169735 A1 * 9/2018 ......... H04L 65/4038

* cited by examiner

*Primary Examiner* — Duc Nguyen
*Assistant Examiner* — Carissa A Jones
(74) *Attorney, Agent, or Firm* — Kilpatrick Townsend & Stockton LLP

(57) ABSTRACT

Systems and methods for providing dynamic layouts for video conferencing participants are disclosed. In a computer-implemented method, a video conference provider may determine a first layout of a plurality of participants of a video conference and output it to the client device. The video conference provider may receive a first signal from a first participant. The video conference provider can determine, for a subset of the plurality of participants, one or more participation metrics, in which at least one participation metric for the first participant is based on the first signal. Responsive to comparing the participation metrics for the subset of the plurality of participants, the video conference provider may determine a second layout of the plurality of participants, in which the subset of the plurality of participants are arranged based on the one or more participation metrics and output, to the client device, the second layout.

20 Claims, 12 Drawing Sheets

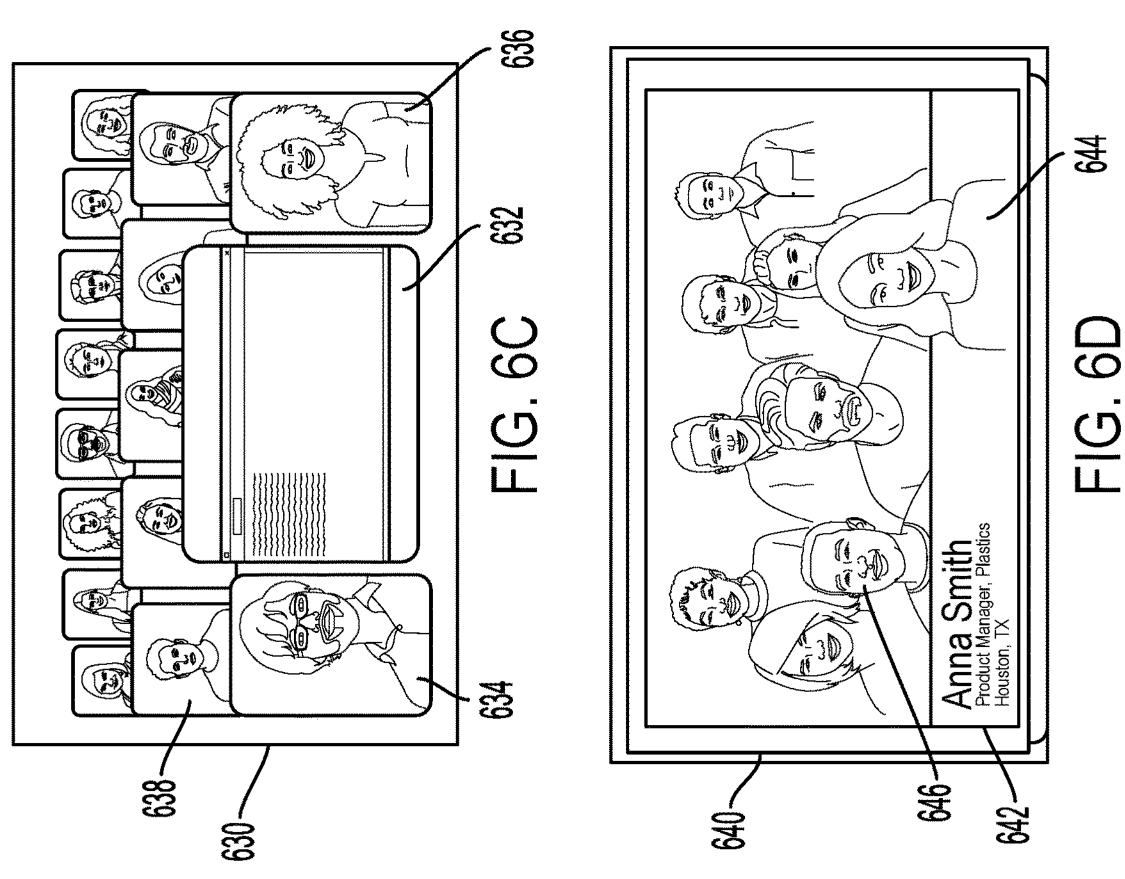
FIG. 6C
FIG. 6D

DYNAMIC LAYOUTS OF VIDEO CONFERENCING PARTICIPANTS

FIELD

The present application generally relates to video conferencing, and more particularly relates to systems and methods for providing dynamic layouts of video conferencing participants.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

FIGS. 5A-E show an example of a dynamic layout for video conferencing participants according to some aspects of the present disclosure.

FIGS. 6A-D show examples of dynamic layouts according to some aspects of the present application.

DETAILED DESCRIPTION

Figure 1:
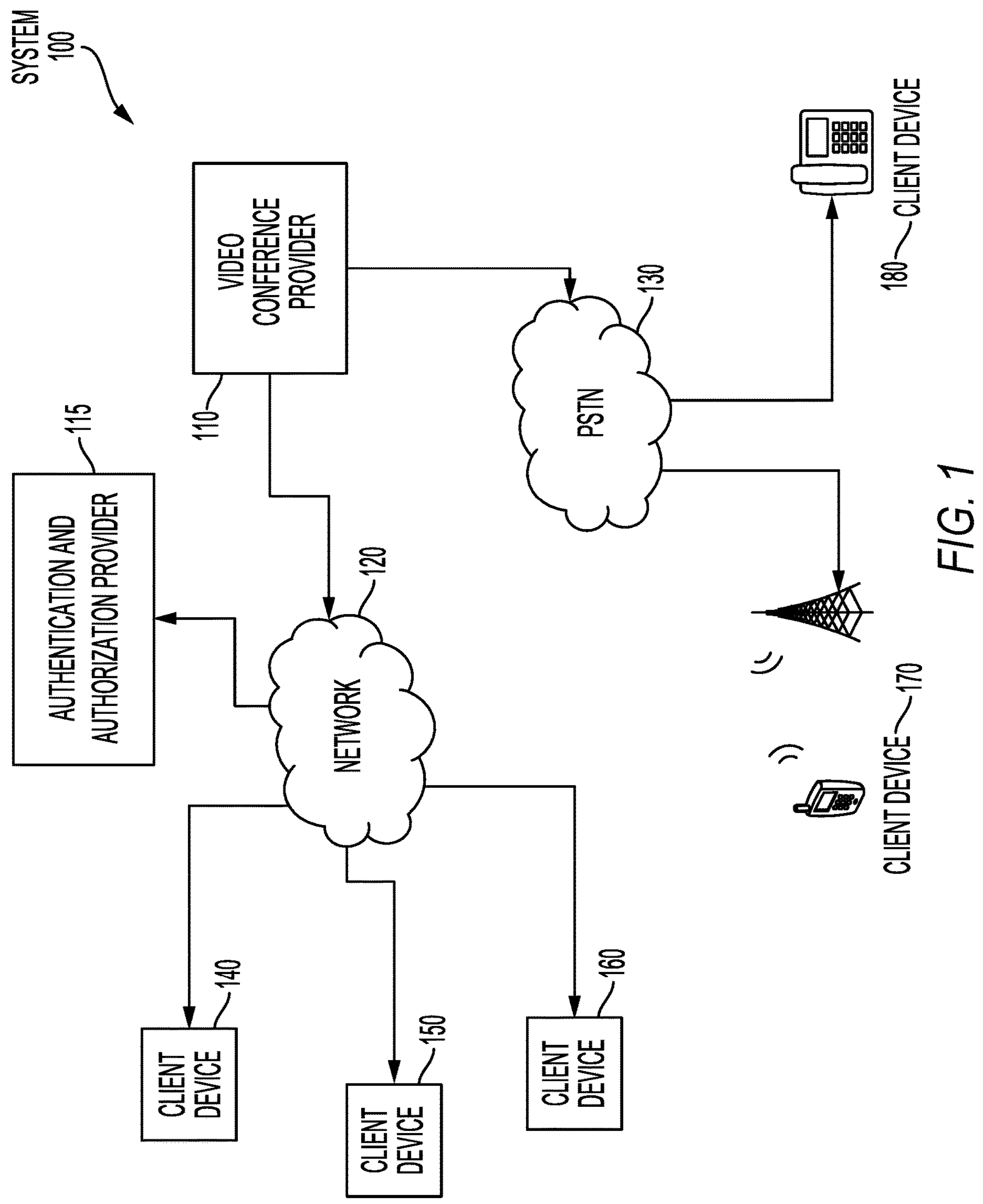
FIG. 1 shows an example system that provides videoconferencing functionality to various client devices.

Examples are described herein in the context of systems and methods for providing dynamic layouts for video conferencing participants. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Traditionally, personal and business meetings consisted of gathering two or more people together in a room. But video conferencing has now become a routine component of personal and business communications. A common scenario involves hybrid video conferences which include some participants gathered in-person as well as some participants joining the conference remotely. Where the in-person participants may be able to sense the expressions, body language, presence, and so on of the other in-person participants, the remote participants are often represented only by a muted image in a box or may not be visible at all. Thus, the in-person participants have a richness of experience that is lacking for the remote participants. And the lack of richness and depth is not merely aesthetic. Perceived sensations and presence may be closely related to participation, the accuracy of information conveyed, team cohesion, and many other important aspects of collaboration. Existing display technologies for video conferencing may lack systems or methods for enhancing the experience of remote video conference participants.

Another related scenario involves the educational or seminar context. As with the meeting described above, hybrid educational settings may include in-person participants in addition to remote participants. In contrast to the aims of connectedness for remote participants with a high level of engagement, the host of an educational meeting may attempt to promote engagement by participants exhibiting a lower level of engagement or participation. For instance, the host of an educational meeting may desire to emphasize participants who have not spoken recently or who have their camera turned off. Additionally, it may be impractical for the preoccupied host of a video conference for teaching to keep track of the participation or reactions of a large number of student participants. Existing display technologies for video conferencing lack systems or methods for encouraging engagement among participants with a low level of active participation or for automatically drawing attention to the students who are attempting to engage.

During a video conference, one or more participants are typically displayed on the screen of a client device. As used herein, the "layout" refers to the appearance or arrangement of the one or more participants on the screen of a client device. In a typical example, the layout includes a series of boxes featuring a visual depiction of each video conference participant. For example, the boxes may contain the camera video stream of some participants or a name, icon, or photo of participants with camera off. The boxes may be arranged in rows and may have various sizes according to the configuration of the client device. All participants may not be shown on the screen at one time. For instance, a layout may be paged such that only a portion of the participants are visible at any given time and user action is required to display the remainder of the participants.

In the scenario just discussed, the in-person participants may all be represented in a single box in the layout showing, for example, a picture of all the participants in the conference room. In contrast, each remote participant may be shown in an individual box, ordered and sized according to some criteria. The in-person users may see remote users only sporadically or in some cases, not at all. Existing approaches may emphasize or highlight the currently speaking participant but fail to capture other measures or aggregate measures of participation, track the history of measures of participation, or include layout changes other than ordering, among other shortcomings. Some users may be forced to change view settings several times during the course of a video conference to achieve the level of engagement desired.

These difficulties can be addressed using example systems and methods for providing dynamic layouts of video conferencing participants. The following non-limiting example is provided to introduce certain embodiments. In this example, a user of a client device joins a video conference hosted by a video conference provider including a plurality of participants. Initially, upon enablement of dynamic layouts, a computing device determines a first layout of the plurality of participants. For example, a video conference provider can determine the first layout according to one or more default criteria. The first layout may be a simple ordering corresponding to the chronological ordering of participants joining the video call or other default procedure. In some examples, the first layout can correspond to a fixed layout selected by the originator of the video conference. Instructions are output by the video conference provider to cause the client device to display the first layout on a display device.

The video conference provider receives a signal from a first participant. The signal can be any measure of participation by a video conference participant. In a simple example, the signal may be the participant speaking. Other signals may include raising a virtual hand or performing other reactions, being pinned or spotlighted by other participants, toggling a camera status, muting or unmuting, or sending a chat message, among other possibilities. Signals may themselves have measurable secondary properties like duration, frequency, intensity, and so on that may be measures of participation. Some signals may be inferred. For instance, a signal relating to speaking may be determined from a muted status of a microphone or from the presence or absence of an audio stream with particular characteristics.

The video conference provider then determines, for a subset of the plurality of participants, one or more participation metrics, in which at least one participation metric for the first participant is based on the first signal. The quantifiable signals and their associated secondary properties are used to generate the participation metrics, which are comparable values for determining relative levels of engagement or participation. For instance, a participation metric may represent the level of engagement or lack thereof of a particular participant. A participation metric may be an arithmetic, weighted combination or representation of one or more signals.

Different participation metrics may be relevant for different scenarios. In a hybrid work meeting, the system may be configured to adjust the layout to emphasize participants with a high level of engagement to reward participation and improve perceptions of connectedness. In contrast, in an educational context, the system may be configured to adjust the layout to emphasize participants with a low quantified level of engagement to encourage participation. As used herein, the term "engagement" refers to one or more participant behaviors that relate to the goals of a video conference. Thus, what is engagement may vary depending on the participants, the setting, the context, the date, and so on. Some example systems may provide for customization of the factors or weights making up the participation metrics so that engagement can be locally or organizationally defined according to the needs of the video conference participants.

Metrics may only be available or determined for a subset of the participants such that the layout may only be partially determined by the comparison of participation metrics. As used herein, the term "emphasize" is used to mean positioning of a video conference participant within a layout in accordance with a particular measure of participation or engagement. For example, a participant with a high level of participation may be emphasized by being shown in large, prominently displayed participant box in a layout.

One example of a participation metric may be related to the time since each participant has last spoken. This measure of time can be quantified for each participant through a normalization process and then compared. This participation metric may be augmented with additional quantified data relating to the frequency of each participant speaking and/or the average duration of each period of speech. In some examples, these additional secondary properties of the speech signal may be standalone participation metrics. Participation metrics may be compared individually or in combination, and in some examples, the participation metrics to be used for layout calculation may be configured. For instance, a dynamic layout utilizing rows for showing emphasis may use participation metrics relating to speaking while a dynamic layout highlighting recent chat messages may use participation metrics relating to chat messaging.

The video conference provider then compares one or more participation metrics for the subset of participants. Responsive to comparing the participation metrics for the subset of participants, the video conference provider determines a second layout of the plurality of participants, in which the subset of the plurality of participants are arranged based on the one or more participation metrics. For instance, in a simple example involving a participation metric related to the time since each participant last spoke, a subset of the plurality of participants may be ordered in ascending order according to the participation metric.

In another example, the dynamic layout may include participant boxes of different sizes for showing different degrees of emphasis. For instance, larger participant boxes may be arrayed in a row for participants with higher participation metrics followed by rows containing smaller participant boxes corresponding to lower participation metrics. Other dynamic layouts may include arrangements on backgrounds, chat overlays, reactions, or participant information, among other examples. A variety of dynamic layouts may be available according to the configuration of the video conference, host settings, and so forth.

Instructions are then output to the client device to cause the display device of the client device to display the second layout. In some examples, the first layout is transitioned to the second layout using a smooth animated transition to visually show the change in emphasis between the plurality of participants as the relative values of the participation metrics change.

In some embodiments, a dynamic layout includes three rows: a top row, a middle row, and bottom row. The bottom row may contain large participant boxes corresponding to higher participation metrics, the middle row may contain somewhat smaller participant boxes, corresponding to lower participation metrics, and the top row may contain even smaller participant boxes corresponding to even lower participation metrics. In this way, a smaller number of large participant boxes is most prominently displayed on the screen of the client device, thus promoting engagement with remote participants with the highest participation metrics.

The dynamic layout consisting of three rows just described may, for example, cause a video conference participant to be reminded of being in a room containing rows of individuals, in which the individuals in the physically closest row appear largest. In some examples, the rows behind the front, most prominent row may be blurred or augmented with additional opacity to reinforce the sense of hierarchy that users of client devices may be caused to perceive.

In some embodiments, given a second participant and a second signal, participation metrics can be determined for both the first participant and the second participant. Responsive to comparing their respective participation metrics, the example layout just described may be determined by the video conference provider such that based on comparing at least one participation metric of the first participant to at least one participation metric of the second participant, the first participant is in the bottom row and the second participant is in the middle row. This relative placement in the layout suggests a higher participation metric for the first user in the bottom row based on the more prominent visual presentation or emphasis.

In some embodiments, the second layout is responsive to one or more dimensions of the display device of the client device. As used herein, the term "responsive" refers to the way in which a layout behaves when properties of the client device display like orientation, size, or aspect ratio are adjusted. For example, a layout may include 3 rows for a smartphone screen in a vertical orientation but only 2 rows for the same smartphone screen in a horizontal orientation.

In some embodiments, the signal may include participant actions including, among others, speaking, setting a status, sharing a screen, sending a reaction, or sending a chat message. In some embodiments, the signal may be pinning of the first participant by a second participant. In some embodiments, the signal corresponds to a status of a participant including camera activation status, microphone mute status, chat participation status, or other participant statuses.

In some embodiments, following receipt of the first signal and after a period of time, a second signal is received from a second participant. The video conference provider can determine if the period of time is greater than a specified threshold. For example, the specified threshold may be 10 seconds. If so, then a third layout of the plurality of participants can be determined and displayed, in which the third layout is based on the period of time exceeding the specified threshold. For example, the first participant may be prominently displayed in a layout based on a high level of participation. If a second participant's participation metric exceeds the first participant's due to some actions on the part of the second participation, the layout will only re-adjust if a certain amount of time has passed to prevent the layout from changing too quickly or constantly, which may cause distraction or disorientation of some participants.

In some embodiments, the video conference provider may determine, using a machine learning model, a learned signal from the first participant. The learned signal can be used, as with the conventional signals discussed above, to determine a participation metric that can be used to cause an update to the layout displayed on the client device. For example, the machine learning model may be trained to identify aggregate measures of participation based on labeled training data that include actions or behaviors that correspond to high or low levels of participation. Such aggregate measures may be included in the determination or comparison among participation metrics.

In some embodiments, layouts may include information about the participants. For example, some example layouts may include biographical information about participants with the highest levels of participation that are most prominently displayed on the layout. In some examples, the biographical information is only displayed when the participant attains a high level of prominence for the first time.

In some embodiments, layouts may include chat messages. For example, an example signal may be the sending of a public chat message by a participant that may be indicative of a certain level of participation. Upon determination of the corresponding participation metric and of a new layout, the chat message may be included along with the display of the participant in a place of emphasis or prominence.

In some embodiments, layouts may include reaction display panels. For example, an example signal may be the generation of a reaction. As used herein, the word "reaction" refers to an action taken by a participant in response to some other action by themself or another participant. An example reaction may be the sending of or triggering of an emoji or raised hand symbol in response to the spoken word, chat, or other action by another participant. The use of a reaction may be indicative of some level of participation. Upon determination of the corresponding participation metric and of a new layout, the reaction display panel may include information about the reaction(s) sent by participants that are emphasized by the layout.

The innovations of the present disclosure provide a significant improvement to the field of video conferencing technology. Hybrid video conferences are flawed in that they fail to give remote participants equal presence in the room. Due to the emphasis placed on remote participants in dynamic layouts with high levels of engagement, both in-person and remote participants may be able to collaborate more closely and contribute substantially to the meeting, an improvement to the technology that can contribute directly to productivity and revenues.

Existing technologies were only capable of naively updating layouts according to criteria that is not indicative of participation or engagement. With the innovations of the present disclosure, layouts can be dynamically updated based on a customizable aggregation of nuanced participation signals according to the needs to the video conference organizer. Various dynamic layouts are available to fulfill the needs of myriad personal and business use cases which can each themselves be associated with custom participation metrics, adapted to the particular participation requirements of each video conference.

These illustrative examples are given to introduce the reader to the general subject matter discussed herein and the disclosure is not limited to these examples. The following sections describe various additional non-limiting examples and examples of systems and methods for providing dynamic layouts for video conferencing participants.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the chat and video conference provider 110. For example, the chat and video conference provider 110 can be located within a private network to provide video conferencing services to devices within the private network, or it can be connected to a public network, e.g., the internet, so it may be accessed by anyone. Some examples may even provide a hybrid model in which a video conference provider 110 may supply components to enable a private organization to host private internal video conferences or to connect its system to the chat and video conference provider 110 over a public network.

The system optionally also includes one or more authentication and authorization providers, e.g., authentication and authorization provider 115, which can provide authentication and authorization services to users of the client devices 140-160. Authentication and authorization provider 115 may authenticate users to the chat and video conference provider 110 and manage user authorization for the various services provided by chat and video conference provider 110. In this example, the authentication and authorization provider 115 is operated by a different entity than the chat and video conference provider 110, though in some examples, they may be the same entity.

Figure 2:
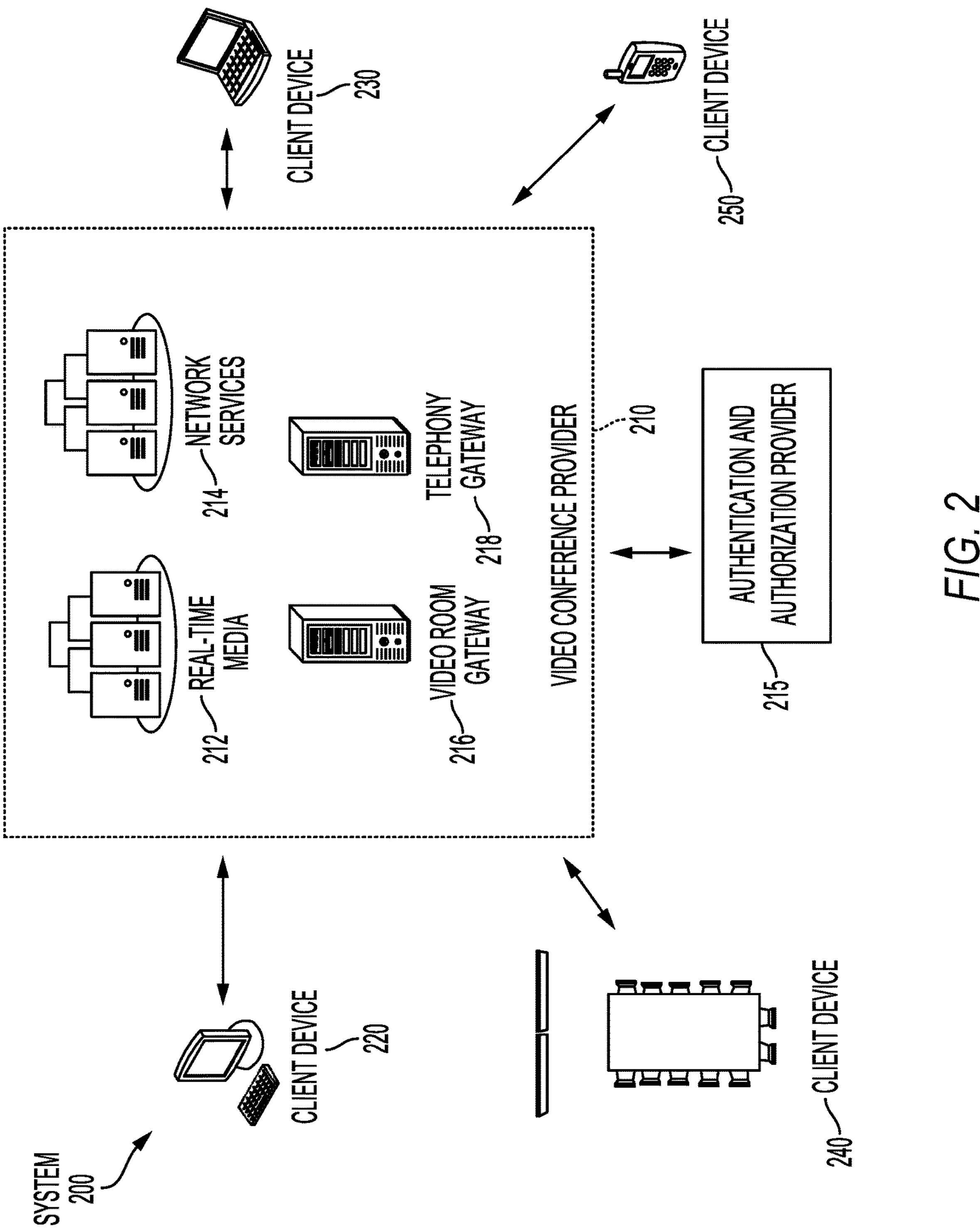
FIG. 2 shows an example system in which a video conference provider provides videoconferencing functionality to various client devices.

Video conference provider 110 allows clients to create videoconference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the chat and video conference provider 110. It should be understood that the term "meeting" encompasses the term "webinar" used herein.

Meetings in this example video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the chat and video conference provider 110, a user may contact the chat and video conference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the chat and video conference provider 110 may prompt the user for certain information, such as a date, time, and duration for the meeting, a number of participants, a type of encryption to use, whether the meeting is confidential or open to the public, etc. After receiving the various meeting settings, the chat and video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the chat and video conference provider 110. They also receive audio or video information from the chat and video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and video conference provider 110 may also invalidate the meeting information, such as the meeting identifier or password/passcode.

To provide such functionality, one or more client devices 140-180 may communicate with the chat and video conference provider 110 using one or more communication networks, such as network 120 or the public switched telephone network ("PSTN") 130. The client devices 140-180 may be any suitable computing or communication devices that have audio or video capability. For example, client devices 140-160 may be conventional computing devices, such as desktop or laptop computers having processors and computer-readable media, connected to the chat and video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the chat and video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and are not limited solely to dedicated telephony devices like conventional telephones.

Referring again to client devices 140-160, these devices 140-160 contact the chat and video conference provider 110 using network 120 and may provide information to the chat and video conference provider 110 to access functionality provided by the chat and video conference provider 110, such as access to create new meetings or join existing meetings. To do so, the client devices 140-160 may provide user authentication information, meeting identifiers, meeting passwords or passcodes, etc. In examples that employ an authentication and authorization provider 115, a client device, e.g., client devices 140-160, may operate in conjunction with an authentication and authorization provider 115 to provide authentication and authorization information or other user information to the chat and video conference provider 110.

An authentication and authorization provider 115 may be any entity trusted by the chat and video conference provider 110 that can help authenticate a user to the chat and video conference provider 110 and authorize the user to access the services provided by the chat and video conference provider 110. For example, a trusted entity may be a server operated by a business or other organization with whom the user has created an account, including authentication and authorization information, such as an employer or trusted third-party. The user may sign into the authentication and authorization provider 115, such as by providing a username and password, to access their account information at the authentication and authorization provider 115. The account information includes information established and maintained at the authentication and authorization provider 115 that can be used to authenticate and facilitate authorization for a particular user, irrespective of the client device they may be using. An example of account information may be an email account established at the authentication and authorization provider 115 by the user and secured by a password or additional security features, such as single sign-on, hardware tokens, two-factor authentication, etc. However, such account information may be distinct from functionality such as email. For example, a health care provider may establish accounts for its patients. And while the related account information may have associated email accounts, the account information is distinct from those email accounts.

Thus, a user's account information relates to a secure, verified set of information that can be used to authenticate and provide authorization services for a particular user and should be accessible only by that user. By properly authenticating, the associated user may then verify themselves to other computing devices or services, such as the chat and video conference provider 110. The authentication and authorization provider 115 may require the explicit consent of the user before allowing the chat and video conference provider 110 to access the user's account information for authentication and authorization purposes.

Once the user is authenticated, the authentication and authorization provider 115 may provide the chat and video conference provider 110 with information about services the user is authorized to access. For instance, the authentication and authorization provider 115 may store information about user roles associated with the user. The user roles may include collections of services provided by the chat and video conference provider 110 that users assigned to those user roles are authorized to use. Alternatively, more or less granular approaches to user authorization may be used.

When the user accesses the chat and video conference provider 110 using a client device, the chat and video conference provider 110 communicates with the authentication and authorization provider 115 using information provided by the user to verify the user's account information. For example, the user may provide a username or cryptographic signature associated with an authentication and authorization provider 115. The authentication and authorization provider 115 then either confirms the information presented by the user or denies the request. Based on this response, the chat and video conference provider 110 either provides or denies access to its services, respectively.

For telephony devices, e.g., client devices 170-180, the user may place a telephone call to the chat and video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and video conference provider 110. For example, telephony devices may be unable to provide authentication information to authenticate the telephony device or the user to the chat and video conference provider 110. Thus, the chat and video conference provider 110 may provide more limited functionality to such telephony devices. For example, the user may be permitted to join a meeting after providing meeting information, e.g., a meeting identifier and passcode, but only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide account information to the chat and video conference provider 110, even in cases where the user could authenticate and employs a client device capable of authenticating the user to the chat and video conference provider 110. The chat and video conference provider 110 may determine whether to allow such anonymous users to use services provided by the chat and video conference provider 110. Anonymous users, regardless of the reason for anonymity, may be restricted as discussed above with respect to users employing telephony devices, and in some cases may be prevented from accessing certain meetings or other services, or may be entirely prevented from accessing the chat and video conference provider 110.

Referring again to video conference provider 110, in some examples, it may allow client devices 140-160 to encrypt their respective video and audio streams to help improve privacy in their meetings. Encryption may be provided between the client devices 140-160 and the chat and video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and video conference provider 110, while allowing the chat and video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the chat and video conference provider 210 over a communications network, such as the internet for client devices 220-240 or the PSTN for client device 250, generally as described above with respect to FIG. 1. The chat and video conference provider 210 is also in communication with one or more authentication and authorization providers 215, which can authenticate various users to the chat and video conference provider 210 generally as described above with respect to FIG. 1.

In this example, the chat and video conference provider 210 employs multiple different servers (or groups of servers) to provide different examples of video conference functionality, thereby enabling the various client devices to create and participate in video conference meetings. The chat and video conference provider 210 uses one or more real-time media servers 212, one or more network services servers 214, one or more video room gateways 216, one or more message and presence gateways 217, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the chat and video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and video conference provider 210 may allow a meeting participant to notify it of inappropriate behavior or content in a meeting. Such a notification may trigger the real-time media servers to 212 record a portion of the meeting for review by the chat and video conference provider 210. Still other functionality may be implemented to take actions based on the decrypted multimedia streams at the chat and video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and video conference provider under a supervisory set of servers. When a client device 220-250 accesses the chat and video conference provider 210, it will typically communicate with one or more network services servers 214 to access their account or to participate in a meeting.

When a client device 220-250 first contacts the chat and video conference provider 210 in this example, it is routed to a network services server 214. The client device may then provide access credentials for a user, e.g., a username and password or single sign-on credentials, to gain authenticated access to the chat and video conference provider 210. This process may involve the network services servers 214 contacting an authentication and authorization provider 215 to verify the provided credentials. Once the user's credentials have been accepted, and the user has consented, the network services servers 214 may perform administrative functionality, like updating user account information, if the user has account information stored with the chat and video conference provider 210, or scheduling a new meeting, by interacting with the network services servers 214. Authentication and authorization provider 215 may be used to determine which administrative functionality a given user may access according to assigned roles, permissions, groups, etc.

In some examples, users may access the chat and video conference provider 210 anonymously. When communicating anonymously, a client device 220-250 may communicate with one or more network services servers 214 but only provide information to create or join a meeting, depending on what features the chat and video conference provider allows for anonymous users. For example, an anonymous user may access the chat and video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may select a user to remove and issue a command through a user interface on their client device. The command may be sent to a network services server 214, which may then disconnect the selected user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have been completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the chat and video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the chat and video conference provider 210. For example, the video conferencing hardware may be provided by the chat and video conference provider to one or more of its subscribers, which may provide access credentials to the video conferencing hardware to use to connect to the chat and video conference provider 210.

The video room gateway servers 216 provide specialized authentication and communication with the dedicated video conferencing hardware that may not be available to other client devices 220-230, 250. For example, the video conferencing hardware may register with the chat and video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and video conference provider 210.

Referring now to the telephony gateway servers 218, these servers 218 enable and facilitate telephony devices' participation in meetings hosted by the chat and video conference provider 210. Because telephony devices communicate using the PSTN and not using computer networking protocols, such as TCP/IP, the telephony gateway servers 218 act as an interface that converts between the PSTN, and the networking system used by the chat and video conference provider 210.

For example, if a user uses a telephony device to connect to a meeting, they may dial a phone number corresponding to one of the chat and video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio streams to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

In some embodiments, in addition to the video conferencing functionality described above, the chat and video conference provider 210 (or the chat and video conference provider 110) may provide a chat functionality. Chat functionality may be implemented using a message and presence protocol and coordinated by way of a message and presence gateway 217. In such examples, the chat and video conference provider 210 may allow a user to create one or more chat channels where the user may exchange messages with other users (e.g., members) that have access to the chat channel(s). The messages may include text, image files, video files, or other files. In some examples, a chat channel may be "open," meaning that any user may access the chat channel. In other examples, the chat channel may require that a user be granted permission to access the chat channel. The chat and video conference provider 210 may provide permission to a user and/or an owner of the chat channel may provide permission to the user. Furthermore, there may be any number of members permitted in the chat channel.

Similar to the formation of a meeting, a chat channel may be provided by a server where messages exchanged between members of the chat channel are received and then directed to respective client devices. For example, if the client devices 220-250 are part of the same chat channel, messages may be exchanged between the client devices 220-240 via the chat and video conference provider 210 in a manner similar to how a meeting is hosted by the chat and video conference provider 210.

Figure 3:
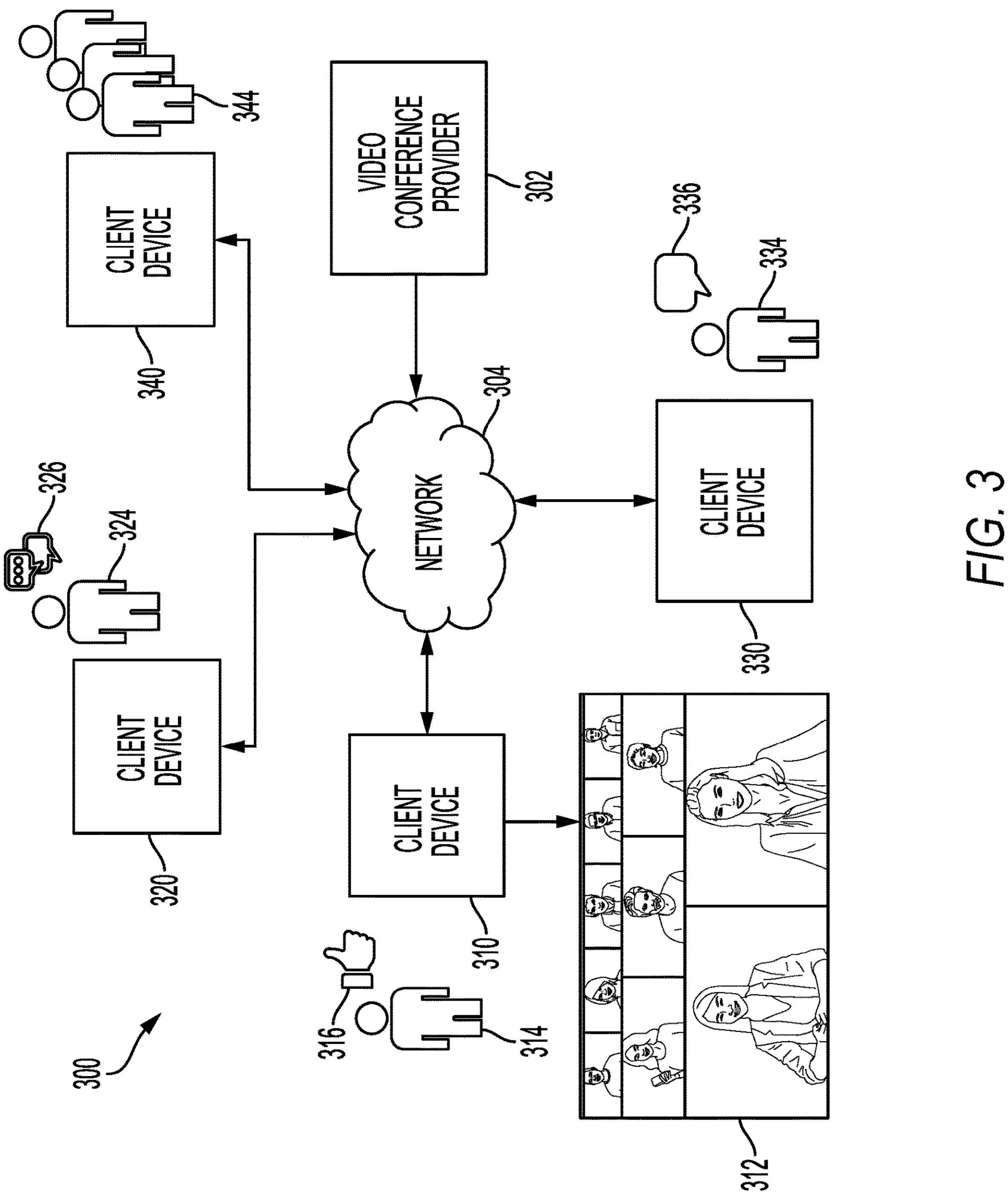
FIG. 3 shows an example of a system for providing dynamic layouts of video conference participants, according to some aspects of the present disclosure.

Referring now to FIG. 3, FIG. 3 shows an example of a system 300 for providing dynamic layouts of video conference participants, according to some aspects of the present disclosure. One or more client devices 310, 320, 330, 340 are communicatively coupled with a video conference provider 302. For example, the client devices 310, 320, 330, 340 may be coupled to the video conference provider over a network 304. The network 304 can include public networks, private networks, the Internet, or any other suitable combination of networked devices. In some embodiments, the client devices 310, 320, 330, 340 may be configured using point-to-point networking and may be directly communicatively coupled with each other.

In example system 300, the video conference provider 302 hosts a video conference with one or more participating client devices. Each client device may be used by one or more participants. For example, a client device can be an individual laptop, smartphone, tablet, or other similar personal device. The client device may include functionality for receiving signals from participants using the client device. For example, the client device may include a microphone for receiving audio signals, a keyboard for receiving chat messages, a mouse for capturing reactions. A typical video conference includes a plurality of individual participants using personal or enterprise client devices connected via the video conference provider 302.

A client device can also include one or more devices used to connect multiple participants to a video conference simultaneously. A common setup, for instance, involves one or more devices in a conference room configured to connect all individuals in the conference room to a video conference simultaneously. Such meetings may be called hybrid meetings, because they include a plurality of participants in the same physical space along with one or more participants in another physical space. In this context, the one or more devices in the conference room make up one client device. The one or more devices may include, as with the personal device, peripherals like microphones, keyboards, and mice. Any number of such devices may be used to collect signals from the in-person participants in a hybrid meeting. One commercial example of such a client device configuration is a Zoom Room.

Client device 310 is shown along with an example dynamic layout 312. The layout 312 may be caused to be displayed on a display device connected to the client device 310. The display device may be any suitable device for displaying layout 312 including a desktop monitor, laptop screen, smartphone screen, and so on.

The layout 312 is a graphical portrayal of some or all of the video conference participants. Additional example layouts will be shown and discussed in FIGS. 5 and 6. In example layout 312, three rows of participants are depicted. This may include all or a subset of the plurality of participants involved in a video conference. The bottom row includes two large participant boxes that may correspond to a high level of participation. The middle row includes three somewhat smaller boxes that may correspond to a lower level of participation. The top row includes five even smaller boxes that may correspond to an even lower level of participation. In layout 312, one of the participants in the bottom row is further emphasized with an active speaker box indicating that the participant is currently speaking. It should be emphasized that layout 312 is just one example dynamic layout. Any number of additional layouts may be predetermined for achieving desired emphases or otherwise improving the user experience.

In some examples, the layout 312 is arranged according to certain criteria. For instance, meeting participants can be simply ordered in rows according to chronological order of arrival time in the video conference. In some other examples, participants may be initially ordered or displayed according to some starting criteria, like arrival time. Certain actions of participants may trigger a rearrangement of the layout. For instance, if a participant speaks, the layout may change such that the participant who has just spoken is visible and/or highlighted.

However, as discussed above, simply rearranging the layout fails to solve the problem of limited participation during hybrid meetings. For example, a small number of in-person participants doing most of the speaking could be highlighted at the expense of the visibility of the remote participants doing less speaking. The innovations of the present disclosure include examples of dynamic layouts of video conferencing participants. Dynamic layouts are layouts of video conference participants that are based on criteria that include one or more participation metrics. For example, in layout 312 the two participants depicted in the bottom row may have the highest participation metric, followed by the three in the middle row, followed by the five in the top row. In some examples including, for example, the educational context, the layout 312 may be configured to emphasize participants with lower participation metrics. Alternatively, lower engagement can be associated with higher participation metrics if an inverse calculation. An inverse calculation is one that converts a low numerical value to a high numerical value by, for example, taking the multiplicative inverse, but other arithmetic techniques for an inverse calculation are possible.

The participation metrics are determined on the basis of one or more received signals from a subset of the plurality of video conference participants. Signals can be any measure of participation by a video conference participant. In a simple example, the signal may be the participant speaking. Other signals may include raising a hand or performing other reactions, being pinned or spotlighted by other participants, toggling a camera status, muting or unmuting, or sending a chat message, among other possibilities.

Signals may themselves have secondary properties like duration, frequency, intensity, and so on. Some signals may be inferred. For instance, a signal relating to speaking may be determined from the muted status of the microphone or from the presence or absence of an audio stream with particular characteristics, e.g., with an average amplitude below a threshold or with no detected speech.

Some signals may include information, data, or streams from multiple cameras, artificial intelligence ("AI") cameras, or intelligent director systems. In these systems, a room may include a plurality of cameras providing the video stream for the participants in the room and the system may determine, based on various visual and audio information, which camera to use for the video stream of the room. These systems may provide input as signals, or signals may be inferred from intelligent director systems. For example, the selection of a particular camera may be a basis for making an inference about engagement or participation in the room.

From the signals, the participation metrics are determined. A participation metric may be directly determined from one or more signals. For example, a participation metric may be a measure of what fraction of the video conference each participant has been unmuted. This fraction can vary between 0 and 1.0 for each participant. One or more participants may thus have an associated unmuted fraction, which can then be compared. For instance, participants with a higher fraction may receive more emphasis. In another context, like the educational content, participants with a lower fraction may receive more emphasis. In the event two or more participants have the same value for a participation metric, a mechanism for deconfliction may be used. For instance, a participant can be randomly chosen for emphasis in the event two users have the same value. In another example, participants with the same value can be selected for emphasis sequentially, in a round-robin fashion.

In some examples, participation metrics may be aggregate metrics including arithmetically-combined, weighted, quantifiable measurements of one or more signals. For example, a participation metrics could be a weighted sum of normalized measures of participation. The resultant participation metrics are compared and a layout is determined on the basis on the comparison, according to the configuration of the dynamic layout system.

Client device 310 has participant 314. Participant 314 is depicted with reaction 316. Reaction 316 is an action taken by participant 314 in response to some occurrence during the video conference. For example, reaction 316 may be a button pushed by participant 314 indicating endorsement ("liking" or "thumbs up") of a comment made by a speaker or in chat. Other similar reactions are possible including raised hands, dislikes, hearts, and so on. Other types of reactions are possible. For example, reactions can also include indications received from chat or video. For example, a participant may type "I loved that!" or raise their hand. Example system 300 may be configured to identify such reactions from audio or video streams.

Likewise, client device 320 is used by participant 324 who is sending chat message 326. Client device 330 is used by participant 334 who is speaking statement 336. Client device 340 depicts several participants 344 connected to the video conference using a single client device 340. Participants 344 may be, for example, several participants in a conference room.

Reaction 316 of participant 314, chat message 326 of participant 324, and statement 336 of participant 334 are examples of signals that are received during the video conference. These example signals, among others, are used by the video conference provider to calculate one or more participation metrics, as discussed above. For example, if a participant has sent a chat message during a video conference, that action may be a binary input to a participation metric. A binary input is one that contributes fully or not at all. In contrast, non-binary inputs to participation metrics can include discrete or continuous numerical values or non-numerical values. For example, a numerical input may be the fraction of the video conference that a participant has had their camera activated. An example non-numerical input includes the content of the most recent chat message sent by a participant. Secondary properties of signals may be used as input to participation metrics. For instance, the number of chat messages sent, the length of the messages, the frequency of sending, or other properties of the sent chat messages may also be secondary properties that are input to one or more participation metrics.

Figure 4:
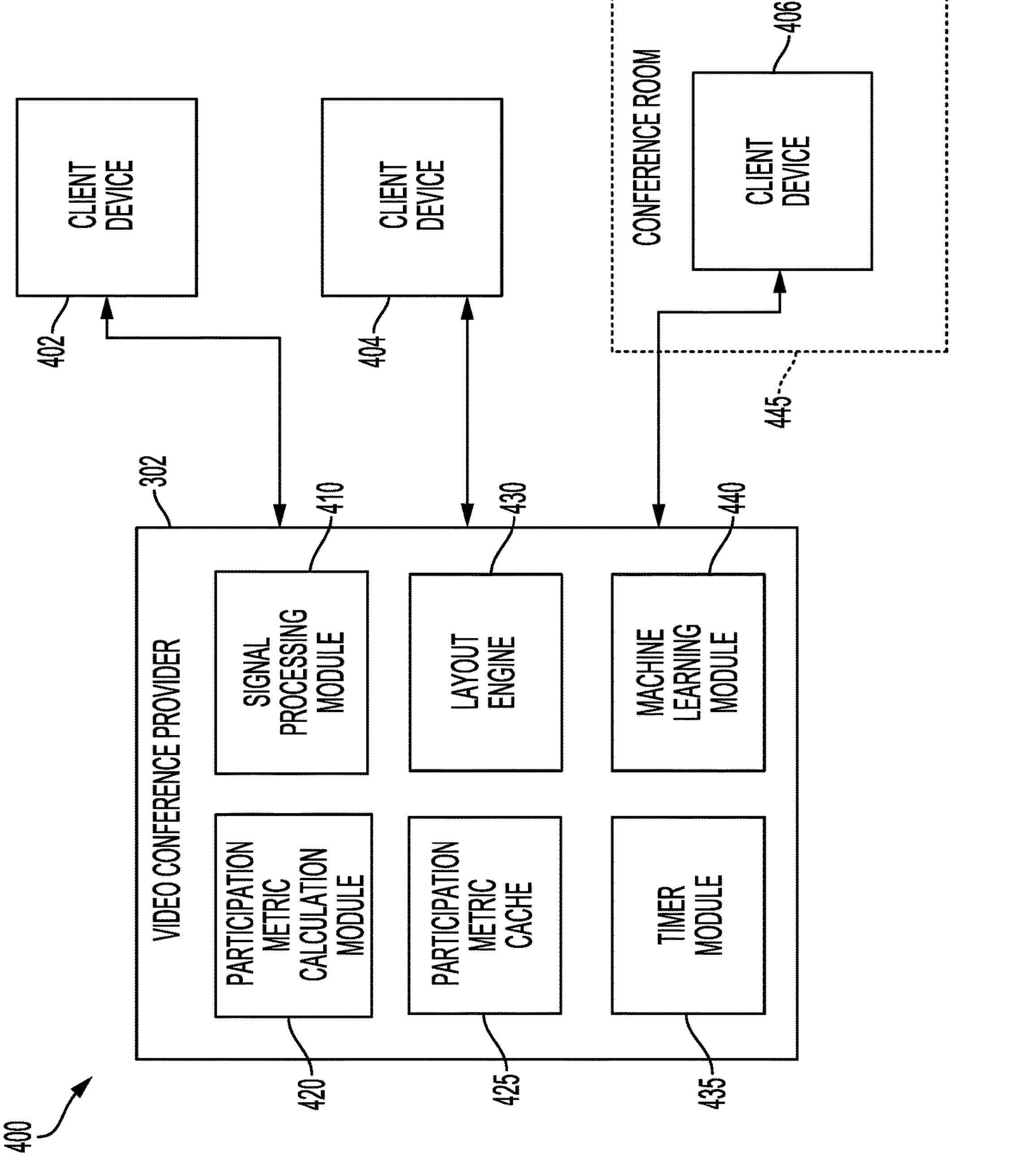
FIG. 4 shows an example of a system for providing dynamic layouts of video conferencing participants, according to some aspects of the present disclosure.

Referring now to FIG. 4, FIG. 4 shows an example of a system 400 for providing dynamic layouts of video conferencing participants, according to some aspects of the present disclosure. System 400 depicts an example implementation of video conference provider 302 that includes components for providing dynamic layouts for video conferencing participants. The functionality of the video conference provider 302 described herein may be implemented as hardware, software, or both. In some examples, the components of the video conference provider 302 may be hosted in remote servers. For example, in one implementation, machine learning model 440 may be hosted by a remote cloud compute engine.

Client devices 402, 404, 406 may be any suitable device for connecting to a video conference including an individual laptop, smartphone, tablet, or other similar personal device. Each client device may be used by one or more participants. For example, a single client device 406 may be used by multiple participants in a conference room 445. Client devices 402, 404, 406 include a display device for viewing graphical user interfaces for configuration, control, and participation in video conferences. The GUI may be displayed on a personal computer screen, smartphone screen, tablet screen, or the like. FIGS. 5-7 show several examples of GUIs that may be used with dynamic layouts for video conferencing participants.

One or more client devices can join a video conference hosted by video conference provider 302. The video conference may have one or more participants, including the users of the client devices 402, 404, 406. Some video conferences may have a plurality of participants using a plurality of client devices 402, 404, 406. A client device may include a number of components for receiving signals from participant using the client device. For example, the client device may include a microphone for receiving audio signals, a keyboard for receiving chat messages, or a mouse for capturing reactions. A typical video conference includes a plurality of individual participants using personal or enterprise client devices connected via the video conference provider 302.

The video conference provider 302 may be similar to the video conference provider 110, 210 described in FIGS. 1 and 2. The video conference provider 302 may be used for planning, hosting, coordination of, and securing video conferences among a plurality of participants, among other functions. The video conference provider 302 receives and relays audio and video streams from client devices 402, 404, 406, as well as direct and indirect (inferred) signals from the same.

Video conference provider 302 includes a signal processing 410 component. Signals can include any information that can be a measure of participation by a video conference participant. In a simple example, the signal may be a participant presently speaking. Other signals may include raising a hand or performing other reactions, being pinned or spotlighted by other participants, toggling a camera status, muting or unmuting, or sending a chat message, among other possibilities. Signals may themselves have secondary properties like duration, frequency, intensity, and so on.

Some signals may be inferred or indirect. For instance, a signal relating to speaking may be determined from the muted status of the microphone or from the presence or absence of an audio stream with particular characteristics. Indirect signals are derived from direct signals received by the signal processing 410 component.

Signal processing 410 receives data from client devices 402, 404, 406 including video and audio streams as well as additional information and telemetry. From the data, signal processing 410 can determine one or more signals associated with the various participants of a video conference. For example, signal processing 410 may use one participant's audio stream and mute status together to determine that the participant has been speaking for a period of time.

The signals determined by signal processing 410 are used in participation metric calculation 420 for the determination of participation metrics. Video conference participants may each have one or more associated participation metrics. In some examples, participation metrics are aggregate metrics. Aggregate metrics arithmetically combine participation metrics using a weighted sum or other appropriate mathematical method.

Prior to calculation, some signals may be converted to a format suitable for arithmetic calculation or other operations. For example, a state or status signal like the status of microphone muting for one participant may be quantified to a binary numerical value indicating the status. In another example, a signal related to video can be inferred from a participant's camera status. In some examples, audio data may be converted from the time domain into the frequency domain to identify frequencies generally associated with human voices or speech. Signal processing 410 may determine that a participant has participated using video by measuring the time between subsequent camera activation/de-activations.

In some examples, aggregate participation metrics contain metrics that are normalized. Normalization is necessary to compare or combine participation metrics using different numerical scales. For example, a metric that relates to the fraction of the total conference time that a participant has had their camera turned on may be expressed as a floating point value between 0.0 and 1.0. A metric that relates to the length of time a participant has had their camera turned on may be expressed as a number in units of seconds. To compare or combine these values, the latter metric may be divided by the total length of the conference to ensure that it is on a comparable scale between 0.0 and 1.0. Other suitable normalization methods or numerical scales may be used.

In an example participation metric calculation, consider a participation metric that is aggregate metric that is an arithmetic combination of a binary value that represents whether a participant is currently speaking or not and total speaking time for the call. This metric may be represented, for each participant or a subset thereof, as PM=W1*(speaking)+W2*(total speaking time). In this example representation, (speaking) may be a 0 or 1 to indicate whether the participant is or is not currently speaking. (total speaking time) may be a normalized value calculated by measuring the total amount of time a participant has spoken during a video conference and dividing it by the length of the video conference. W1 and W2 reflect the relative importance of the two terms in the particular dynamic layout. In some examples, the weights may sum to 1 to ensure a participation metric value less than or equal to 1. For example, if W1=0.2 and W2=0.8, the (speaking) term can contribute at most 0.2 to the participation metric and the normalized (total speaking time) term can contribute at most 0.8 to the participation metric. These weighting choices reflect the configuration decision to devote great emphasis to participants who have been contributing more overall, rather than who are currently contributing.

Calculated participation metrics are stored in participation metric cache 425. Because video conferences are relatively short in duration, an in-memory cache may be suitable for storing ephemeral metadata associated with the conference including transient, volatile participation metrics. For example, participation metric cache 425 may be implemented using open-source, in-memory data stores. In some implementations, one or more participation metrics may be associated with each user using a key that identifies the participant, the type of participation metric or membership in an aggregate metric, and points to the corresponding value. For example, a participation metric that represents the fraction of the last 10 minutes that participant "p1" has been speaking may be represented with key "p1:speak10" and have associated value 0.6. In another example, this participation metric as a constituent of an aggregate metric "agg2" may be identified using key "p1:agg2:speak10" and may be combined with other metrics using a weight identified with key "p1:agg2:speak10:w". In some examples, for extended video conferences, calculated participation metrics may be persistently stored on a memory device including, for instance, a database or file system.

In some examples, participation metric cache 425 or another memory device may be used for persisting participation metrics across multiple meetings. For example, in the educational context, a teacher may host the same class over a series of video conference meetings. Participation metric cache 425 can be configured to persist metrics that start in a first meeting such that during a second meeting, calculation of the persisted metric is resumed from the values that concluded the first meeting. Likewise, any data, weights, or other information used for the calculation of metrics, may be persisted after a first meeting and be used cumulatively in subsequent meetings. For instance, such persisted metrics could track student participation over a week or longer so that a longer-term measurement of participation or engagement could be used to determine the layout. In that example, the layout may emphasize students with low participation in a particular class session but also emphasize those that historically have low participation.

Video conference provider 302 includes a layout engine 430. The layout engine 430 receives information ephemerally persisted by participation metric cache 425 and determines layouts according to one or more configuration parameters associated with a selected dynamic configuration layout. For example, if a participant has enabled dynamic layouts, then the layout engine 430 determines the layout for the video conference participants using participation metrics for a subset of participants. In some examples, the layout engine 430 may render the layout according to the participation metrics and send the rendered layout to the client devices 402, 404, 406 as part of a video stream. In some other examples, the layout engine 430 may determine the layout using a particular representation and send the representation to the client devices 402, 404, 406 to be rendered. For instance, the layout engine 430 may generate a data structure that includes information about the arrangement or configuration of the selected dynamic layout, specify the locations of the participants in the dynamic layout, whether any transitions are or should occur, and so on.

Layout engine 430 may include components for implementing additional algorithms for affecting the relative layout or ordering of participants on a dynamic layout. In one example, the layout engine 430 may include an anti-abuse component. For example, in order to prevent participants from supplying artificial signals to boost apparent engagement and obtain otherwise unwarranted emphasis in a dynamic layout, the anti-abuse component may include program code for determining the quality of participation. The machine learning model 440, discussed below, can also be used for the classification of the substance or quality of engagement.

In another example, the layout engine 430 may include an engagement tracking component. The engagement tracking component can compare the signal information and calculated participation metrics to pre-determined threshold values to ensure that certain participants do not dominate the reception of emphasis in the dynamic layout. For example, in one configuration, after a participant has received emphasis in a dynamic layout for 20 minutes, that participant may no longer be able to receive the same level of emphasis for the remainder of the video conference, regardless of participation.

Although the layout engine 430 is shown as a component of the video conference provider 302, in some examples, the layout engine 430 may be a component of the client device. For example, the client device may receive participation metric information from participation metric cache 425 and determine the arrangement of the dynamic layout locally. In this example, the displayed dynamic layout may vary from one client device to the next. For instance, client devices may provide an option to hide participants with their camera turned off. One client device may have this option enabled, while another may not. In that case, the dynamic layout rendered by the layout engine 430 local to the client device may be different as displayed on the display devices of the two client devices. However, in both cases, the dynamic layout is determined on the basis of one or more participation metrics of the subset of the plurality of users.

Video conference provider 302 provides a timer 435. In the scenario where participation metrics are varying frequently, as when multiple participants are actively engaged simultaneously, rapid changes in the dynamic layout could become distracting or disorienting. The timer 435 may be configured to introduce hysteresis into the dynamic layout engine 430 to affect a balance between responsiveness and stability. The introduction of hysteresis refers to the intentional lagging of a user interface element behind the apparent user input.

For example, following receipt of a signal from a participant, a participation metric is updated. After a period of time, a second signal from a different participant is received, and the corresponding participation metric is updated. Without the timer 435, if the relative layout or ordering as determined by the layout engine 430 changes, then the dynamic layout would be updated immediately. The timer 435 determines if the period of time is greater than a specified threshold and only then causes the layout engine to determine an updated layout to send to the client devices 402, 404, 406. Some example implementations have used 7, 10, or 15 seconds for the minimum threshold time before which changes to the dynamic layout may be made. Other algorithms for the addition of hysteresis by the timer 435 may be used. In some examples, the amount of hysteresis, or apparent lag, may be configurable using a configuration component provided by the video conference provider 302 or by a client device.

Video conference provider 302 includes a machine learning model 440. Machine learning model 440 can be used to determine a learned signal based on the behavior of one or more users, as evidenced by audio stream, video stream, telemetry, or other information available from the client devices 402, 404, 406. For example, the machine learning model 440 may contain one or more machine learning models. The machine learning models can be trained using supervised, semi-supervised, or unsupervised training to determine one or more learned signals from all available information. The learned signal can be used for the calculation of participation metrics as described above.

Any suitable machine learning model may be used according to different examples, such as deep convolutional neural networks ("CNNs"); a residual neural network ("Resnet"), or a recurrent neural network, e.g. long short-term memory ("LSTM") models or gated recurrent units ("GRUs") models, a three-dimensional CNN ("3DCNN"), a dynamic time warping ("DTW") technique, a hidden Markov model ("HMM"), a support vector machine (SVM), decision tree, random forest, etc., or combinations of one or more of such techniques—e.g., CNN-HMM or MCNN (Multi-Scale Convolutional Neural Network). Further, some examples may employ adversarial networks, such as generative adversarial networks ("GANs"), or may employ autoencoders ("AEs") in conjunction with machine learning models, such as AEGANs or variational AEGANs ("VAEGANs").

For example, a machine learning model included in machine learning model 440 could be trained using a training data set contained labeled examples of engagement or participation. For instance, the training data set may include historical data taken from past video conferences including participants with varying levels of participation. The participants may be manually labeled or labeled using automated techniques with annotations indicating their level of participation from moment to moment based on some or all available information. The machine learning model 440 can receive this training data to develop a trained machine learning model that can determine a participation level for participants during a video conference. The learned signal may be used as a sole input to the determination of participation metrics or as one of multiple inputs. In some examples, the machine learning model 440 includes a pre-trained machine learning model.

Figures 5A, 5B:
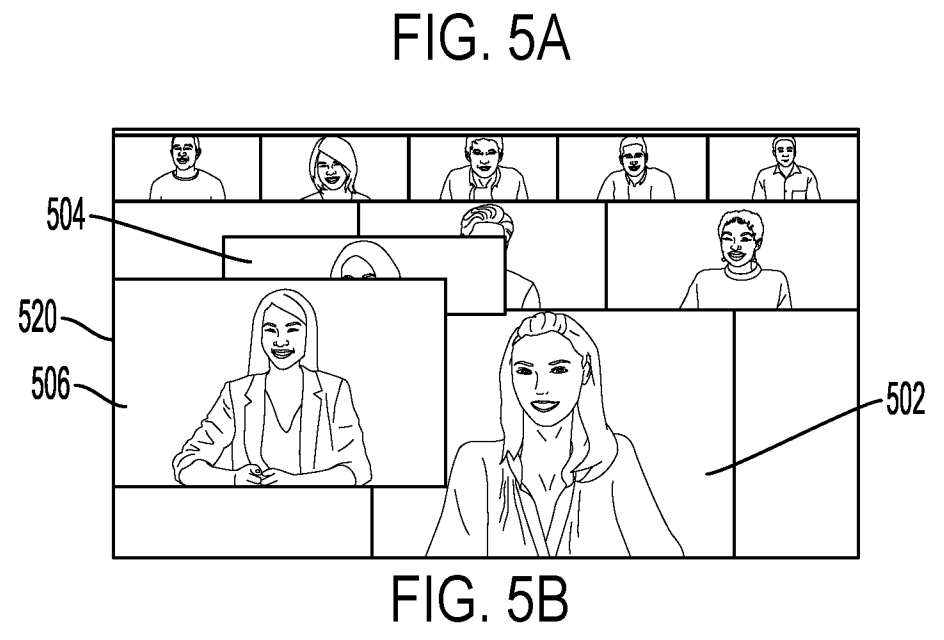
Figures 5C, 5D:
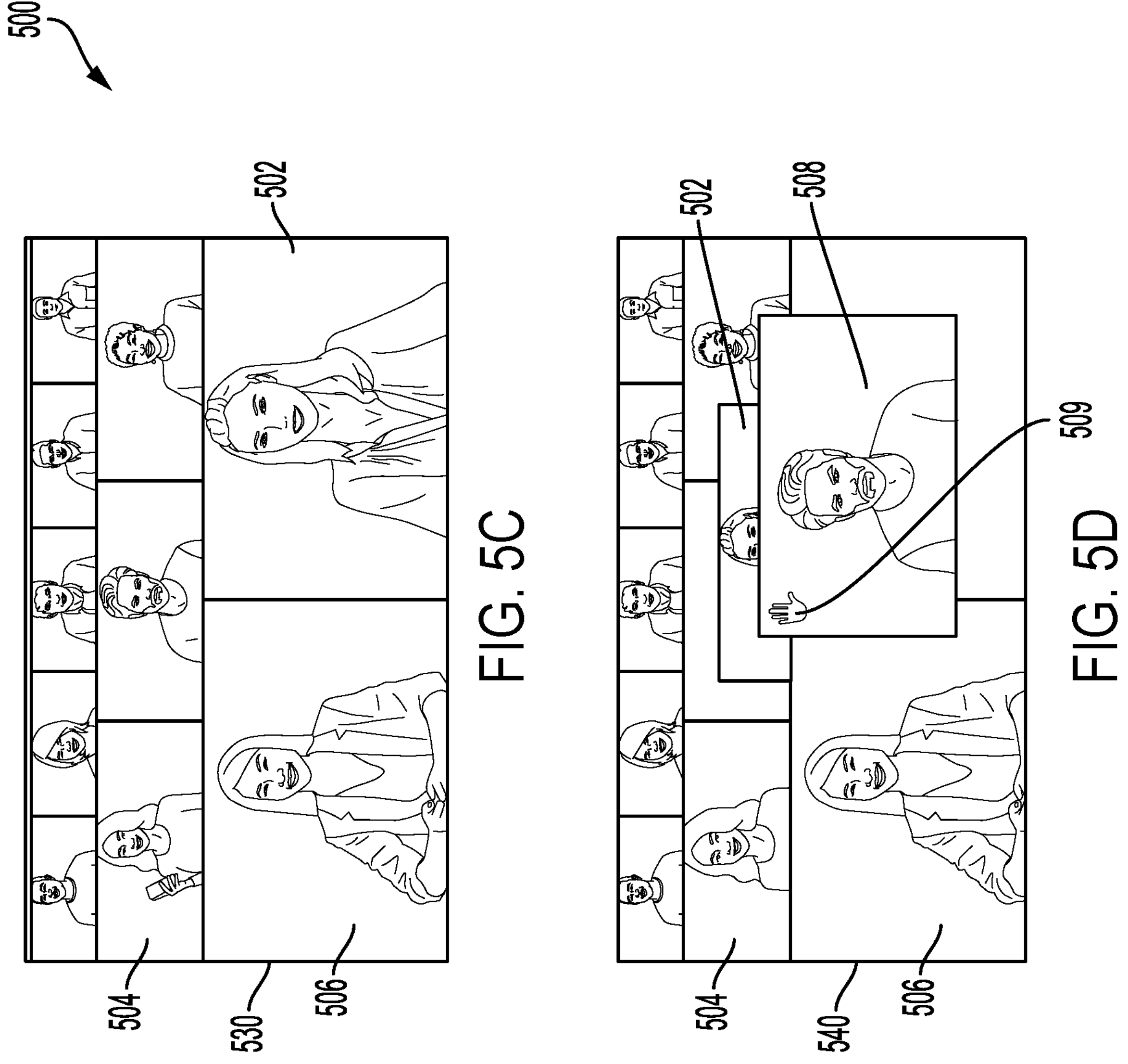

Turning next to FIGS. 5A-E, FIGS. 5A-E show an example of a dynamic layout for video conferencing participants according to some aspects of the present disclosure. FIG. 5A shows an initial layout of the participants in a video conference. Ten video conference participants are depicted, but layouts may include any number of participants. However, in some embodiments, dynamic layouts may only be practical with 5 or more participants. In that case, in the option to enable dynamic layouts shown in FIG. 7 may be disabled or greyed out. In a preferred embodiment, shown in FIG. 5A, ten participants are included. In some examples, the number of participants visible on a dynamic layout may be configurable, up to a maximum number of participants. For instance, some embodiments have a maximum of 25 participants visible on a dynamic layout.

The dynamic layout in FIG. 5A includes a top, middle, and bottom row. the bottom row includes 2 large participant boxes, the middle row includes 3 somewhat smaller participant boxes, and the top row includes 5 even smaller participant boxes. The two largest boxes in the bottom row are receiving the greatest emphasis and may correspond to higher participation metrics. The bottom row includes participant 502 and participant 504. Participant 502 is further highlighted with an active speaker border 510 to indicate that the participant is currently speaking. Middle row includes participant 506.

In some examples, the bottom row may initially include only a single participant box corresponding to the active speaker. As additional signal information is accumulated by the video conference provider 302 and participation metrics are determined, then a second participant box may be added to the bottom row in accordance with the relative layout or ordering of their respective participation metrics.

In FIG. 5B shows an example of dynamic layout 500 transitioning to a new layout. For example, the participation metric for dynamic layout 500 may be aggregate metric that is an arithmetic combination of a binary value that represents whether a participant is currently speaking or not and total speaking time for the call. In FIG. 5B, participant 506 is now speaking and has active speaker border 520. As a result of their speaking, one or more signals associated with participant 506 have been received by the video conference provider 302 to cause participation metrics to be updated. The participation metrics for participants 502, 504, and 506 have been compared and a change in the relative layout or ordering of those metrics has been determined. In response to the change in relative layout or ordering of the respective participation metrics, the arrangement of the boxes in dynamic layout updates. In some examples, the arrangement changes using a smooth animated transition.

In FIG. 5C, the transition is complete and participant 506 has moved to the left side of the bottom row, receiving the greatest emphasis. Participant 502 has moved from the left side of the bottom row to the right side of the bottom row. Participant 504 has moved from the right side of the bottom row to the left side of the middle row. In some examples, these changes in dynamic layout 500 correspond to a change in the relative ordering or ranking of participation metrics for participants 502, 504, and 506 from 1, 2, and 3 to 2, 3, and 1, respectively. Participant 506 continues to speak, as shown by active speaker border 530.

In FIG. 5D, participant 508 has invoked a reaction 509. Reaction 509 is represented by a raised hand. For instance, in response to participant 506 asking if there are any questions, as indicated by active speaker border 540, participant 508 reacted by clicking a button to cause the reaction 509 to be visible as well as to provide a signal to video conference provider 302. For example, the participation metric for dynamic layout 500 may be an aggregate combination of signals including a binary value that represents whether a participant is currently speaking or not, total speaking time for the call, and a binary value that represents whether a participant has a currently visible reaction. Other similar measures may be used including, for example, total number of reactions, variety of reactions, number of reactions relative to other participants, and so on. As a result of participant 508's reaction 509, the participation metrics for participants 502, 504, 506, and 508 have been compared and a change in the relative layout or ordering of those metrics has been determined. In response to the change in relative layout or ordering of the respective participation metrics, the arrangement of the boxes in dynamic layout updates. In some examples, the arrangement changes using a smooth animated transition.

Figure 5E:
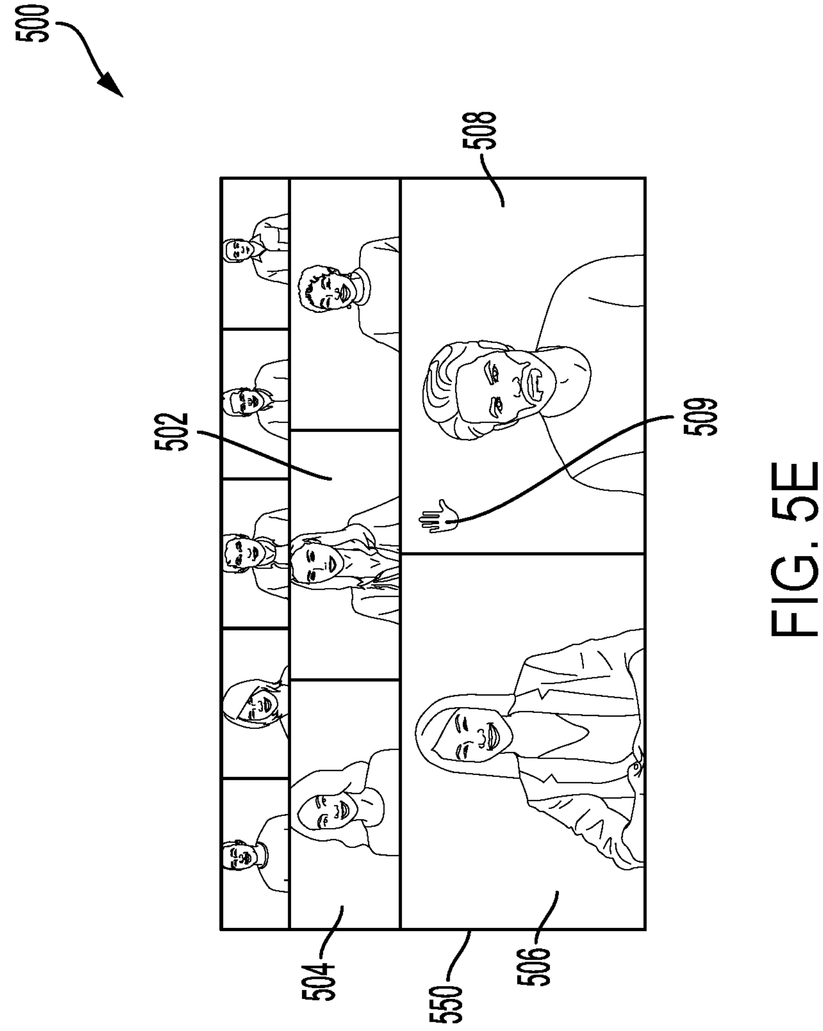
Figure 6B:
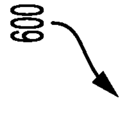
Figure 6B:
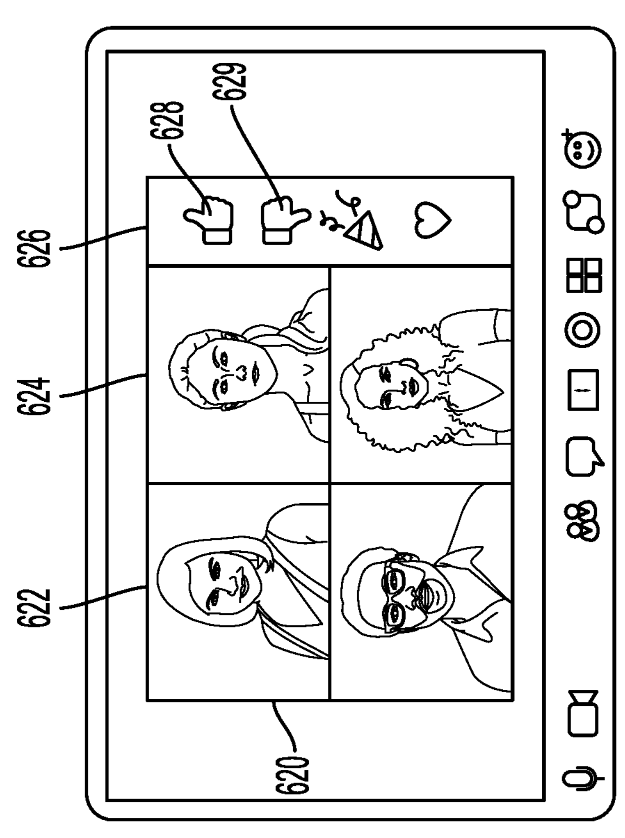

FIG. 5E shows the dynamic layout 500 after the transition is complete. Participant 506 remains on the left side of the bottom row, still receiving the greatest emphasis. Participant 508 is now on the right side of the bottom row. Participant 504 is on the left side of the middle row. Participant 502 is second from the left on the middle row. In some examples, these changes in dynamic layout 500 correspond to a change in the relative ordering or ranking of participation metrics for participants 502, 504, 506, and 508 from 2, 3, 1, and 4 to 4, 3, 1, and 2, respectively. Participant 506 continues to speak, as shown by active speaker border 550.

In this example, participant 508 is now receiving more emphasis than participants 502 or 504 despite not speaking and only reacting. This may be due to the weightings of the quantified signals making up the aggregate participation metric. For example, participant 508 may be higher in the relative ordering of participants due to reaction 509 if the contribution from the binary value that represents whether a participant has a currently visible reaction has a significantly higher weighting than the other two terms.

Turning next to FIGS. 6A-D, FIGS. 6A-D show examples of dynamic layouts 600 according to some aspects of the present application. Some examples depicted in FIGS. 6A-D highlight particular signals associated with one or more participants. In these cases, the associated participation metrics may vary from one dynamic layout to another. A given dynamic layout may have an associated participation metric(s) that corresponds to visual features or functions of that particular layout. One skilled in the art will appreciate that many other dynamic layouts are also possible and that these are merely examples. For example, the examples depicted in FIGS. 6A-D each show dynamic layouts on a single screen, monitor, TV, etc. However, some examples include dynamic layouts that extend onto multiple screens. For instance, the bottom row of FIG. 5A may extend over 2 adjacent screens. Likewise, FIGS. 6A-D feature examples depicting a grid-like or table-like arrangement, but other arrangements may be used. In some examples, the participants may be arranged in ring-like layout or using other shapes, like triangles, diamonds, stars, or ovals.

Figure 6A:
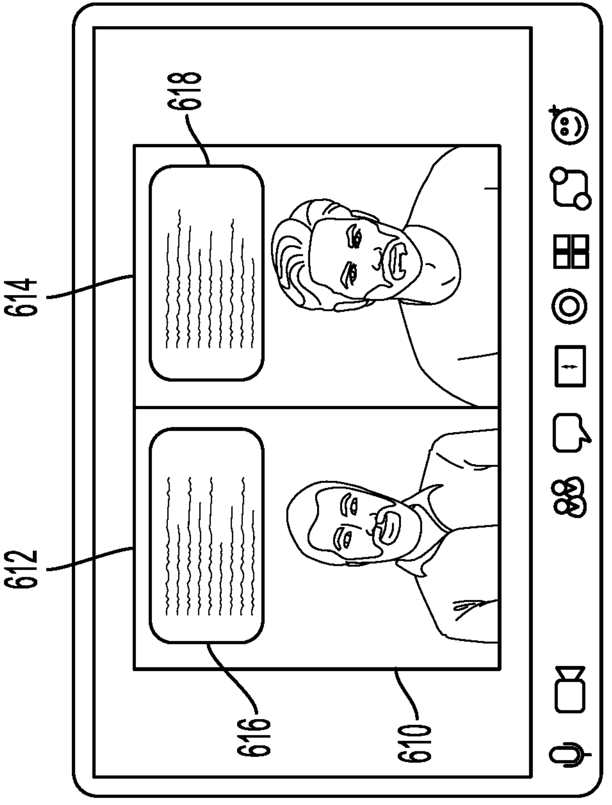
Figure 7:
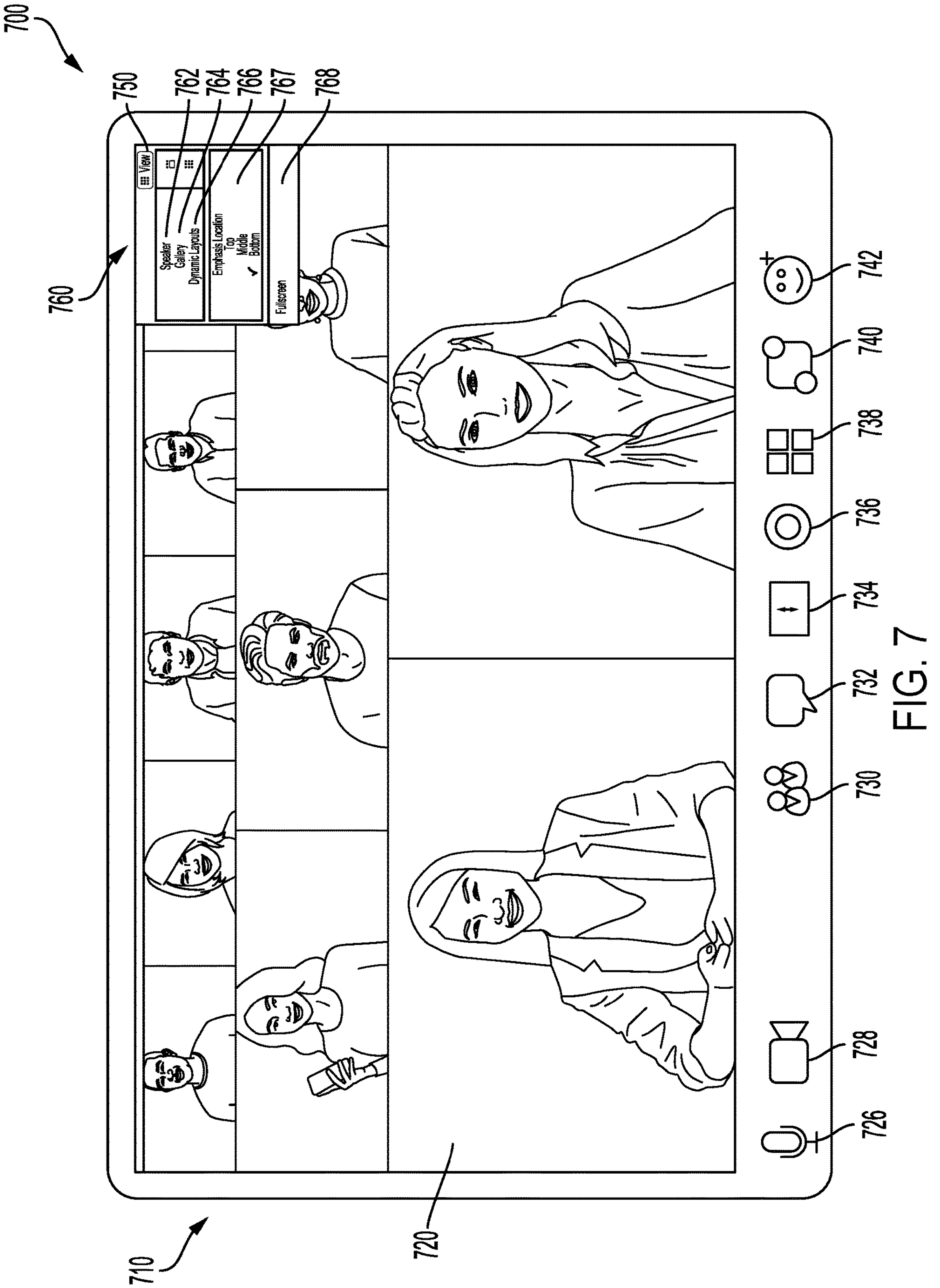
FIG. 7 illustrates an example GUI for configuring dynamic layouts for video conferencing participants, according to some aspects of the present disclosure.

FIG. 6A depicts a chat message overlay dynamic layout 610. Chat message overlay dynamic layout 610 emphasizes participants who utilize a chat messaging function of a client device. In chat message overlay dynamic layout 610, two participants are visible, participant 612 and participant 614. The two visible participants 612, 614 may be shown based on recent actions causing signals that significantly contributed to the associated participation metric.

For example, a participant may have recently sent a chat message or may have sent a large number of chat messages, or both. A chat message 616 is overlayed on top of participant 612 and a chat message 618 is overlayed on top of participant 614. In some examples, chat messages 616 and 618 are the most recent chat messages sent by participants 612 and 614, respectively. Other configurations are possible. For example, chat messages 616, 618 may be messages with high numbers of reactions (e.g., likes) or messages with high numbers of views or responses. Each of these is a signal that can contribute to the participation metric associated with chat message overlay dynamic layout 610, such that the behavior of the dynamic layout is in accord with the factors of the participation metric receiving the largest weight. In one example, only the most recent chat message sent by each participant contributes to the participation metric. In that case, the chat message overlay dynamic layout 610 will always display the two participants who have sent a chat message most recently. In another example, the associated participation metric is an aggregate metric receiving as input signals including most recent chat message, total number of chat messages, length of chat messages, likes, and so on. This results in display of the two participants with a high of chat engagement as measured by a variety of signals.

FIG. 6B illustrates a reaction panel dynamic layout 620. Reaction panel dynamic layout 620 includes several participants. In this example, four participants are shown, including participants 622 and 624. The participants displayed may be based on participation metrics similar to the ones discussed for FIG. 5. For example, the 4 displayed participants may be the ones who have spoken the most frequently in the last ten minutes.

Reaction panel dynamic layout 620 also includes reaction panel 626 that can include reactions caused by video conference participants. For example, reaction 628 is a thumbs-up or like, indicated with a hand in a first with the thumb extended up. Reaction 629 is a thumbs-down or dislike symbol, indicated with a hand in a first with thumb extended down. A large variety of reactions are possible. For instance, the available reactions may correspond to the emojis available in the Supplementary Multilingual Plane ("SMP") of the Unicode Standard.

A video conference participant can cause a reaction to be indicated using, for example, control 742 discussed in FIG. 7 below. Other ways of indicating a reaction include emojis in chat messages, speech recognition, via third-party apps, among others. The indication may be a signal on which a subsequently determined participation metric is based. For example, a certain participation metric may be based on a combination of recent reactions, total number of reactions, reactions to a participant's speech or chat messages, and so on.

Reaction panel 626 may contain one or more reactions indicative of recent or frequent reactions in accordance with determined participation metrics. For example, the reaction panel 626 may display the most recently indicated reactions or an ordered list corresponding to the most frequently indicated reactions. In some examples, the displayed reactions may be sized according to their frequency or recency, or according to another scheme. In this way, FIG. 6B provides an example of a dynamic layout in which one or more participation metrics are used to configure both the arrangement of the participants as well as other objects, like the reactions in reaction panel 626.

FIG. 6C depicts a dynamic layout for screen sharing 630. In dynamic layout for screen sharing 630, participants 634, 636, 638 are arranged in rows, similar to the dynamic layout depicted in FIGS. 5A-E. However, screen share box 632 is also included in the bottom row, receiving a place of emphasis alongside participants 634 and 636. Screen share box 632 is slightly raised and is larger than participant boxes 634, 636 to emphasize it further. The screen share box 632 can be configured to remain fixed in the center of the bottom row or it may be rearranged, along with the participant boxes, in accordance with the relative layout or ordering of participation metrics. For example, the screen share box 632 may use the participation metric(s) of the participant who is sharing their screen.

FIG. 6D illustrates a participant information dynamic layout 640. In participant information dynamic layout 640, participant 644 is emphasized at the bottom of the display, in front of other participants, including, for example, participant 646. Participant information 642 is shown alongside participant 644. For instance, participant information 642 can include biographical or demographic information about participant 644. In some examples, participant information 642 is only shown the first time participant 644 is emphasized based on their participation metric. During subsequent rearrangements of the dynamic layout, the participant 644 may be emphasized, but participant information 642 may not be shown. In some examples, participant information 642 is shown again after a pre-determined period of time has elapsed or after a pre-determined number of rearrangements of the dynamic layout has occurred.

FIG. 7 illustrates an example GUI 700 for configuring dynamic layouts for video conferencing participants, according to some aspects of the present disclosure. Example GUI 700 may be provided for a software client that can interact with a virtual conference provider, such as video conference provider 302, to allow a user to connect to the video conference provider 302, chat with other users, or join virtual conferences. A client device, e.g., client device 310, executes a software client as discussed above, which in turn displays the GUI 700 on the client device's display. In this example, the GUI 700 is showing a dynamic layout 720 inside view window 710, similar to the one discussed in FIG. 5.

Beneath the view window 710 are a number of interactive elements 726-740 to allow the participant to interact with the virtual conference software. Controls 726-728 may allow the participant to toggle on or off audio or video streams captured by a microphone or camera connected to the client device. Control 730 allows the participant to view any other participants in the virtual conference with the participant, while control 732 allows the participant to send text messages to other participants, whether to specific participants or to the entire meeting. Control 734 allows the participant to share content from their client device. Control 736 allows the participant toggle recording of the meeting, and control 738 allows the user to select an option to join a breakout room. Control 740 allows a user to launch an app within the virtual conferencing software, such as to access content to share with other participants in the virtual conference. Control 742 allows a user to select a reaction. A reaction may be selected based on a chat message, spoken work, or for any other reason. Available reactions may include, among others, emojis, GIFs, reactions from third-party applications, and so on.

A user may interact with such a GUI 700 when their client software is operating in a normal configuration, such as while at home or in an office. Thus, the user has full control over their audio and video settings, can freely chat with other participants, and can use any suitable audio or video encoders to provide high quality audio and video streams to other participants in a virtual conference. However, in other scenarios, the GUI 700 may be restricted to only allow certain functionality or to disable certain functionality.

GUI 700 includes certain configuration options. For example, in response to selecting view control 750, a menu 760 may be displayed. Menu 760 may include options for configuring, among other things, view window 710. For example, menu 760 may include controls for speaker view 762, gallery view 764, and dynamic layouts view 766. In FIG. 7, dynamic layout view is currently selected as illustrated by dynamic layout 720.

Menu 760 may include emphasis location selector 767. For example, some dynamic layouts may include various locations within the layout in which a participant may be emphasized. For instance, in example dynamic layout 720 containing three rows, the menu 760 may provide a configuration option to select which of the three rows should contain the speaker(s) receiving the most emphasis. As depicted in FIG. 7, the bottom row is receiving the most emphasis, containing a small number of large participant boxes along with the active speaker indication.

Although a particular example configuration option is shown, one skilled in the art will recognize that a variety of other configuration options may also be provided. For example, the number of participants in each row, alternative arrangements, transition selections, colors, volumes, delays, and so forth are all examples of properties of dynamic layouts that may be provided as configuration options.

Menu 760 also includes a fullscreen control 768 that can be used to expand the contents of the view window 710 to fill the entire display device. In some embodiments, the dynamic layout 720 may be responsive to one or more dimensions of the display device of the client device. A responsive design is one that adapts to the aspect ratio of the currently enabled display device and automatically adjusts to give the best user experience. Selecting fullscreen control 768 may thus change the arrangement of dynamic layout 720. For example, a dynamic layout consisting of 2 rows of 2 and 3 participant boxes may, in response to selection of fullscreen control 768, expand to become 3 rows of 2, 3, and 5 participant boxes.

Figure 8:
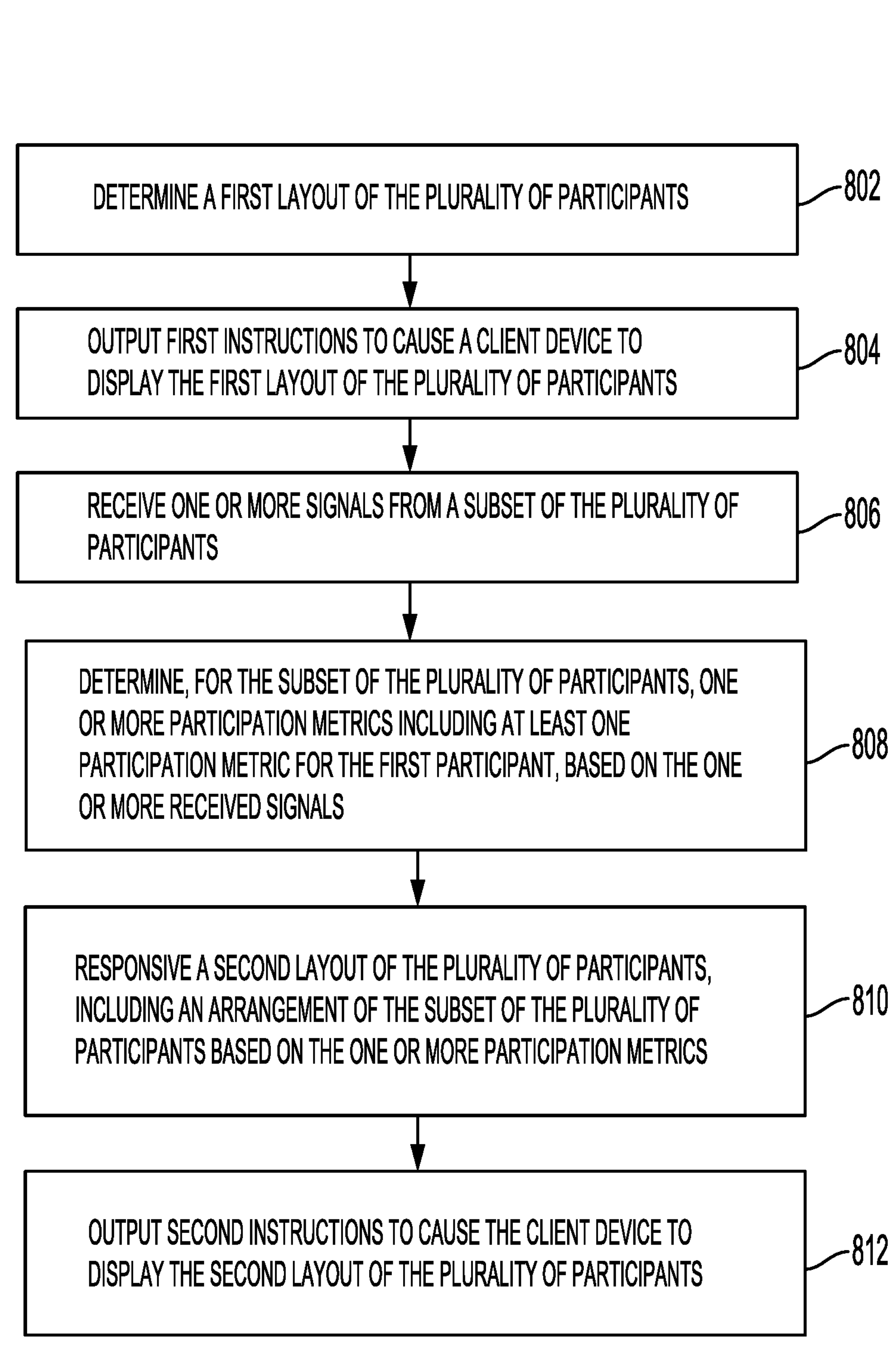
FIG. 8 shows a flowchart of an example method for providing dynamic layouts for video conferencing participants.

Referring now to FIG. 8, FIG. 8 shows a flowchart of an example method 800 for providing dynamic layouts for video conferencing participants. The description of the method 800 in FIG. 8 will be made with reference to FIGS. 3-7, however any suitable system according to this disclosure may be used, such as the example systems 100 and 200, shown in FIGS. 1 and 2.

It should be appreciated that method 800 provides a particular method for providing dynamic layouts for video conferencing participants. Other sequences of operations may also be performed according to alternative examples. For example, alternative examples of the present disclosure may perform the steps outlined above in a different order. Moreover, the individual operations illustrated by method 800 may include multiple sub-operations that may be performed in various sequences as appropriate to the individual operation. Furthermore, additional operations may be added or removed depending on the particular applications. Further, the operations described in method 800 may be performed by different devices, including one or more of the client devices participating in a video conference. One of ordinary skill in the art would recognize many variations, modifications, and alternatives.

The method 800 may include block 802. At block 802, a client device joins a video conference hosted by a video conference provider 302 in which the video conference has a plurality of participants using a plurality of client devices, as generally described above with respect to FIGS. 1-2. The video conference provider 302 determines a first layout of the plurality of participants. For example, if the client device is configured to enable dynamic layouts, when a video conference begins, none or very little participation information is available. The layout may be determined according to a default layout method or according to selections made by the organizer of the video conference. For instance, in some examples, the organizer of the video conference can manually specify a particular initial layout. In other examples, the initial layout may correspond to the chronological order in which participants join the video conference, alphabetical order, random ordering, and so on.

The method 800 may include block 804. At block 804, the video conference provider 302 outputs first instructions to cause the client device to display the first layout of the plurality of participants. The display device may include the screen of a laptop, smartphone, tablet, or the like. Outputting instructions to the client device may include sending a rendered layout over a video stream. For example, the layout engine 430 of the video conference provider 302 may receive participation metrics and configuration data with respect to dynamic layouts and generate a rendered layout for each participant. Dynamic layouts need not be the same for each participant since they may vary among and between participants. For example, a participant may elect to hide their self-view. In that case, the rendered dynamic layout for that participant may vary from that of one who has not hidden the self-view, particularly if the participant is in a place of emphasis based on their high levels of engagement.

In some embodiments, the client device can render the dynamic layout based on information received from the layout engine 430. In this example, the layout engine 430 determines metadata associated with the dynamic layout and each connected client device in a video conference renders the dynamic layout locally.

The instructions output to the client device may be used in concert with local client device configuration settings. For instance, the client device may provide settings to keep the display arrangement fixed or arranged according to a specified arrangement. In some examples, the video conference provider includes global display settings that can be configured with group or organization scope that may override the display settings on client devices. For example, in the educational context, the teacher of a class using video conferencing may require client devices to use dynamic layouts in accordance with a lesson plan or other pedagogical goal.

The method 800 may include block 806. At block 806, the video conference provider 302 receives one or more signals from a subset of the plurality of participants, including a first signal from a first participant. The subset may include one or more participants. A subset may be used so that the layout and/or participation metrics need not be changed for every participant at every update. The signal can be any measure of participation or engagement by a video conference participant. Signals may be quantifiable or non-quantifiable, in which case they must be quantified according to a suitable heuristic. For instance, a signal relating to on-topic discussion may be quantified using a natural language processing ("NLP") model operating on transcribed speech to determine tone, sentiment, or meaning. The signal can be quantified using the classification metadata output by the NLP model. In another simple example, the signal may be the participant speaking, which can be quantified using secondary properties like duration, frequency, or intensity of speech, and so on. Other signals may include raising a hand or performing other reactions, being pinned or spotlighted by other participants, toggling a camera status, muting or unmuting, or sending a chat message, among other possibilities. Some signals may be inferred. For instance, a signal relating to speaking may be determined from the muted status of the microphone or from the presence or absence of an audio stream with particular characteristics.

The method 800 may include block 808. At block 808, the video conference provider 302 determines, for the subset of the plurality of participants, one or more participation metrics including at least one participation metric for the first participant, based on the one or more received signals. For example, participation metric calculation 420 may receive processed signals from signal processing 410 for determination of participation metrics. The calculated metrics may be stored in participation metric cache 425 for ephemeral storage and use by layout engine 430 for determination of layouts.

The method 800 may include block 810. At block 810, the video conference provider 302, responsive to comparing the participation metrics for the subset of the plurality of participants, determines a second layout of the plurality of participants, including an arrangement of the subset of the plurality of participants based on the one or more participation metrics. For example, the layout engine 430 may, according to the specific dynamic layout configuration selected, choose an ordering or arrangement of participants or other objects based on the participation metrics calculated in 808.

The method 800 may include block 812. At block 812, the video conference provider 302 outputs second instructions to cause the client device to display the second layout of the plurality of participants. As mentioned above, the layout engine 430 may render the new layout or send information to the client devices containing information about the new layout so that they may be rendered on the respective client devices. The instructions may thus include rendered video information, sufficient information to render the layout on the client device, or a combination of both.

Figure 9:
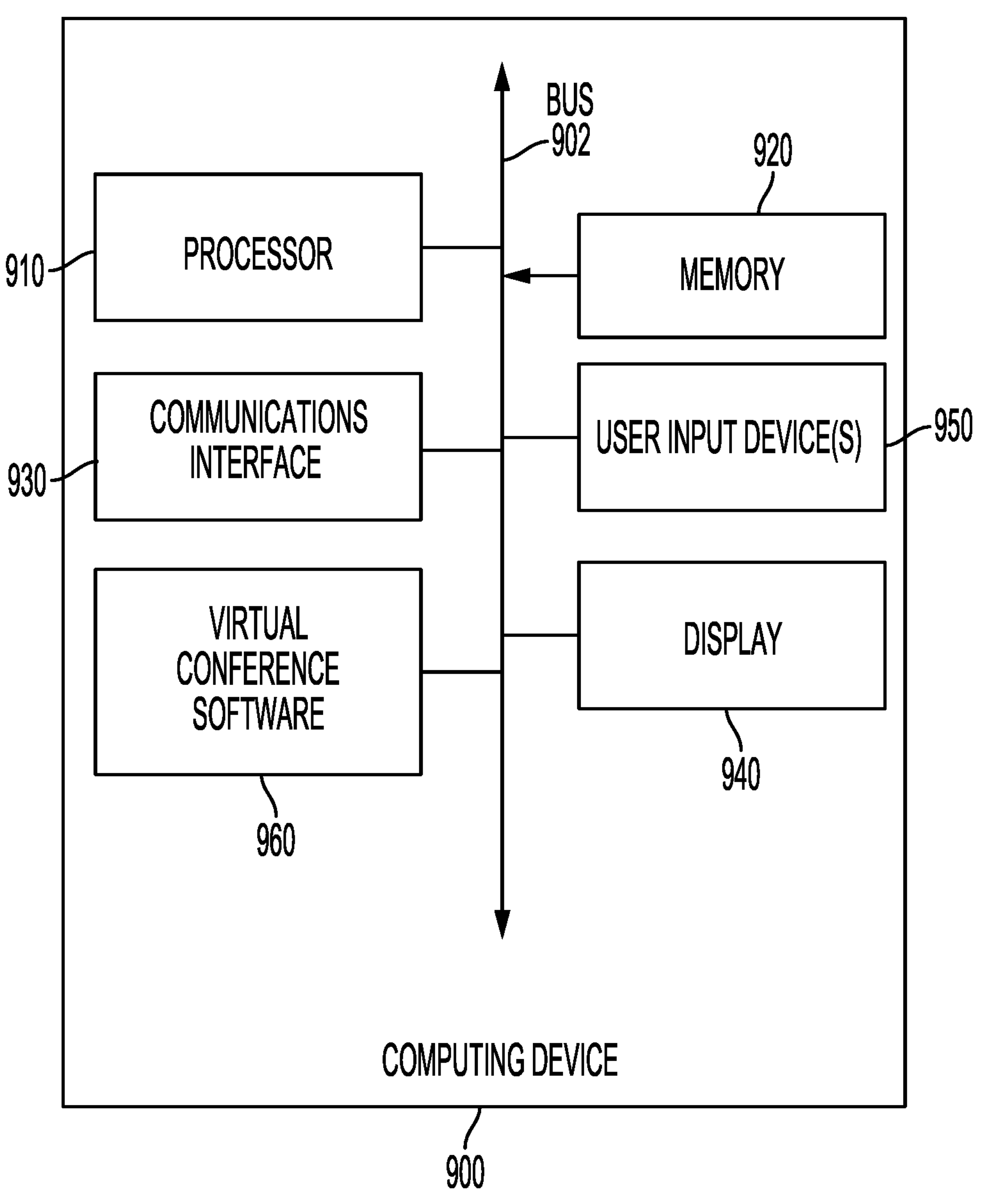
FIG. 9 shows an example computing device suitable for use in example systems or methods for providing dynamic layouts for video conferencing participants according to this disclosure.

Referring now to FIG. 9, FIG. 9 shows an example computing device 900 suitable for use in example systems or methods for providing dynamic layouts for video conferencing participants according to this disclosure. The example computing device 900 includes a processor 910 which is in communication with the memory 920 and other components of the computing device 900 using one or more communications buses 902. The processor 910 is configured to execute processor-executable instructions stored in the memory 920 to perform one or more methods for dynamic layouts for video conferencing participants according to different examples, such as part or all of the example method 800 described above with respect to FIG. 8. The computing device 900, in this example, also includes one or more user input devices 950, such as a keyboard, mouse, touchscreen, microphone, etc., to accept user input. The computing device 900 also includes a display 940 to provide visual output to a user.

In addition, the computing device 900 includes virtual conferencing software 960 to enable a user to join and participate in one or more virtual spaces or in one or more conferences, such as a conventional conference or webinar, by receiving multimedia streams from a virtual conference provider, sending multimedia streams to the virtual conference provider, joining and leaving breakout rooms, creating video conference expos, etc., such as described throughout this disclosure, etc.

The computing device 900 also includes a communications interface 930. In some examples, the communications interface 930 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

EXAMPLES

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification As used below, any reference to a series of examples is to be understood as a reference to each of those examples disjunctively (e.g., "Examples 1-4" is to be understood as "Examples 1, 2, 3, or 4").

Example 1 is a method, comprising: joining, by a client device, a video conference hosted by a video conference provider, the video conference having a plurality of participants using a plurality of client devices; determining a first layout of the plurality of participants; outputting first instructions to cause the client device to display the first layout of the plurality of participants; receiving one or more signals from a subset of the plurality of participants, including a first signal from a first participant; determining, for the subset of the plurality of participants, one or more participation metrics including at least one participation metric for the first participant, based on the one or more received signals; determining a second layout of the plurality of participants, including an arrangement of the subset of the plurality of participants based on the one or more participation metrics; and outputting second instructions to cause the client device to display the second layout of the plurality of participants.

Example 2 is the method of example(s) 1, wherein the second layout includes three rows, including a top row, a middle row, and bottom row, wherein the top row has a first size, the middle row has a second size, and the bottom row has a third size, wherein: the third size is larger than the second size; and the second size is larger than the first size.

Example 3 is the method of example(s) 1, further comprising: receiving a second signal from a second participant;

determining one or more participation metrics for the second participant, wherein at least one participation metric for the second participant is based on the second signal; responsive to comparing the participation metrics for the subset of the plurality of participants, determining a third layout of the plurality of participants, wherein the relative layout of the first and second participants is based on comparing the participation metrics based on the first signal and the second signal; and outputting third instructions to cause the client device to display the third layout of the plurality of participants.

Example 4 is the method of example(s) 1, further comprising: receiving a second signal from a second participant; determining one or more participation metrics for the second participant, wherein at least one participation metric for the second participant is based on the second signal; responsive to comparing the participation metrics for the subset of the plurality of participants, determining a third layout of the plurality of participants, wherein the relative layout of the first and second participants is based on comparing the participation metrics based on the first signal and the second signal; and outputting third instructions to cause the client device to display the third layout of the plurality of participants, wherein the third layout includes three rows, including a top row, a middle row, and bottom row, wherein the top row has a first size, the middle row has a second size, and the bottom row has a third size, wherein: the third size is larger than the second size; the second size is larger than the first size; and based on comparing at least one participation metric of the first participant to at least one participation metric of the second participant, the first participant is in the bottom row and the second participant is in the middle row.

Example 5 is the method of example(s) 1, wherein the second layout is responsive to one or more dimensions of a display device of the client device.

Example 6 is the method of example(s) 1, wherein the first signal includes the first participant taking an action including at least one: speaking, setting a status, sharing a screen, sending a reaction, or sending a chat message.

Example 7 is the method of example(s) 1, wherein the first signal is pinning of the first participant by a second participant.

Example 8 is the method of example(s) 1, wherein the first signal includes one or more statuses of the first participant, wherein the one or more statuses include at least one of: camera activation status, microphone mute status, or chat participation status.

Example 9 is the method of example(s) 1, wherein the outputting the second layout of the plurality of participants comprises an animated transition from the first layout to the second layout.

Example 10 is the method of example(s) 1, further comprising: following receipt of the first signal and after a period of time, receiving a second signal from a second participant; determining if the period of time is greater than a specified threshold; and if the period of time is greater than the specified threshold: determining a third layout of the plurality of participants, wherein the third layout is based on the period of time exceeding the specified threshold; and outputting third instructions to cause the client device to display the third layout of the plurality of participants.

Example 11 is the method of example(s) 1, further comprising: determining, by a machine learning model, a learned signal from the first participant; determining one or more participation metrics for the first participant, wherein at least one participation metric for the first participant is based on the learned signal; responsive to comparing the participation metrics for the subset of the plurality of participants, determining a third layout of the plurality of participants, wherein the third layout is based on the at least one participation metric based on the learned signal; and outputting third instructions to cause the client device to display the third layout of the plurality of participants.

Example 12 is the method of example(s) 1, further comprising: responsive to the determination of the second layout, outputting third instructions to cause the client device to display information about the first participant.

Example 13 is the method of example(s) 1, wherein the first signal is sending a chat message and the second layout includes the chat message.

Example 14 is the method of example(s) 1, wherein the first signal is sending a reaction, and the second layout includes a reaction display panel.

Example 15 is the method of example(s) 1, wherein the at least one participation metric for the first participant based on the first signal is based on a secondary property of the first signal.

Example 16 is a non-transitory computer-readable medium storing a set of instructions, the set of instructions comprising: one or more instructions that, when executed by one or more processors of a device, cause the device to: determine a first layout of a plurality of participants, the plurality of participants using a plurality of client devices for participating in a video conference hosted by a video conference provider; outputting first instructions to cause a client device to display the first layout of the plurality of participants; receive one or more signals from a subset of the plurality of participants, including a first signal from a first participant; determine, for the subset of the plurality of participants, one or more participation metrics including at least one participation metric for the first participant, based on the one or more received signals; determine a second layout of the plurality of participants, including an arrangement of the subset of the plurality of participants based on the one or more participation metrics; and outputting second instructions to cause the client device to display the second layout of the plurality of participants.

Example 17 is the non-transitory computer-readable medium of example(s) 16, further comprising instructions: receive a second signal from a second participant; determine one or more participation metrics for the second participant, wherein at least one participation metric for the second participant is based on the second signal; responsive to comparing the participation metrics for the subset of the plurality of participants, determine a third layout of the plurality of participants, wherein the relative layout of the first and second participants is based on comparing the participation metrics based on the first signal and the second signal; outputting third instructions to cause the client device to display the third layout of the plurality of participants, wherein the third layout includes three rows, including a top row, a middle row, and bottom row, wherein the top row has a first size, the middle row has a second size, and the bottom row has a third size, wherein: the third size is larger than the second size; the second size is larger than the first size; and based on comparing at least one participation metric of the first participant to at least one participation metric of the second participant, the first participant is in the bottom row and the second participant is in the middle row.

Example 18 is the non-transitory computer-readable medium of example(s) 16, wherein the one or more participation metrics includes a first participation metric, the first participation metric including a weighted, arithmetic combination of one or more values derived from the first signal.

Example 19 is a system comprising: one or more processors configured to: determine a first layout of a plurality of participants, the plurality of participants using a plurality of client devices for participating in a video conference hosted by a video conference provider; outputting first instructions to cause a client device to display the first layout of the plurality of participants; receiving one or more signals from a subset of the plurality of participants, including a first signal from a first participant; determining, for the subset of the plurality of participants, one or more participation metrics including at least one participation metric for the first participant, based on the one or more received signals; determining a second layout of the plurality of participants, including an arrangement of the subset of the plurality of participants based on the one or more participation metrics; and outputting second instructions to cause the client device to display the second layout of the plurality of participants.

Example 20 is the system of example(s) 19, further comprising: receiving a second signal from the first participant, wherein the one or more participation metrics includes a first participation metric, the first participation metric including a weighted, arithmetic combination of one or more values derived from the first signal and the second signal.

That which is claimed is:

1. A method, comprising:

joining, by a client device, a video conference hosted by a video conference provider, the video conference having a plurality of participants using a plurality of client devices;

querying, by the client device, an in-memory participation metric cache using information about the plurality of participants, wherein the in-memory participation metric cache comprises a key-value store, each participant of the plurality of participants having one or more associated keys, each associated key corresponding to the participant and a participation metric;

in response to a null result from the in-memory participation metric cache, determining, by the client device, a first layout of the plurality of participants;

outputting first instructions to cause the client device to display the first layout of the plurality of participants;

receiving, by the client device, one or more signals from a subset of the plurality of participants, including a first signal from a first participant;

determining, by the client device and for the subset of the plurality of participants, one or more participation metrics including at least one participation metric for the first participant, based on the one or more received signals;

storing, by the client device, in the in-memory participation metric cache, the determined one or more participation metrics for the subset of the plurality of participants using one or more keys, each key identifying a participant of the plurality of participants and a participation metric of the determined one or more participation metrics;

determining, by the client device, a second layout of the plurality of participants, including an arrangement of the subset of the plurality of participants based on the one or more participation metrics; and outputting second instructions to cause the client device to display the second layout of the plurality of participants.

2. The method of claim 1, wherein the second layout includes three rows, including a top row, a middle row, and bottom row, wherein the top row has a first size, the middle row has a second size, and the bottom row has a third size, wherein:

the third size is larger than the second size; and the second size is larger than the first size.

3. The method of claim 1, further comprising:

receiving a second signal from a second participant;

determining one or more participation metrics for the second participant, wherein at least one participation metric for the second participant is based on the second signal;

responsive to comparing the participation metrics for the subset of the plurality of participants, determining a third layout of the plurality of participants, wherein the relative layout of the first and second participants is based on comparing the participation metrics based on the first signal and the second signal; and outputting third instructions to cause the client device to display the third layout of the plurality of participants.

4. The method of claim 1, further comprising:

receiving a second signal from a second participant;

determining one or more participation metrics for the second participant, wherein at least one participation metric for the second participant is based on the second signal;

responsive to comparing the participation metrics for the subset of the plurality of participants, determining a third layout of the plurality of participants, wherein the relative layout of the first and second participants is based on comparing the participation metrics based on the first signal and the second signal; and outputting third instructions to cause the client device to display the third layout of the plurality of participants, wherein the third layout includes three rows, including a top row, a middle row, and bottom row, wherein the top row has a first size, the middle row has a second size, and the bottom row has a third size, wherein:

the third size is larger than the second size;

the second size is larger than the first size; and based on comparing at least one participation metric of the first participant to at least one participation metric of the second participant, the first participant is in the bottom row and the second participant is in the middle row.

5. The method of claim 1, wherein the second layout is responsive to one or more dimensions of a display device of the client device.

6. The method of claim 1, wherein the first signal includes the first participant taking an action including at least one: speaking, setting a status, sharing a screen, sending a reaction, or sending a chat message.

7. The method of claim 1, wherein the first signal is pinning of the first participant by a second participant.

8. The method of claim 1, wherein the first signal includes one or more statuses of the first participant, wherein the one or more statuses include at least one of: camera activation status, microphone mute status, or chat participation status.

9. The method of claim 1, wherein the outputting the second layout of the plurality of participants comprises an animated transition from the first layout to the second layout.

10. The method of claim 1, further comprising:

following receipt of the first signal and after a period of time, receiving a second signal from a second participant;

determining if the period of time is greater than a specified threshold; and if the period of time is greater than the specified threshold:

determining a third layout of the plurality of participants, wherein the third layout is based on the period of time exceeding the specified threshold; and outputting third instructions to cause the client device to display the third layout of the plurality of participants.

11. The method of claim 1, further comprising:

determining, by a machine learning model, a learned signal from the first participant;

determining one or more participation metrics for the first participant, wherein at least one participation metric for the first participant is based on the learned signal;

responsive to comparing the participation metrics for the subset of the plurality of participants, determining a third layout of the plurality of participants, wherein the third layout is based on the at least one participation metric based on the learned signal; and outputting third instructions to cause the client device to display the third layout of the plurality of participants.

12. The method of claim 1, further comprising:

responsive to the determination of the second layout, outputting third instructions to cause the client device to display information about the first participant.

13. The method of claim 1, wherein the first signal is sending a chat message and the second layout includes the chat message.

14. The method of claim 1, wherein the first signal is sending a reaction, and the second layout includes a reaction display panel.

15. The method of claim 1, wherein the at least one participation metric for the first participant based on the first signal is based on a secondary property of the first signal.

16. A non-transitory computer-readable medium storing a set of instructions, the set of instructions comprising one or more instructions that, when executed by one or more processors of a client device, cause the client device to:

query an in-memory participation metric cache using information about a plurality of participants, the plurality of participants using a plurality of client devices for participating in a video conference hosted by a video conference provider, wherein the in-memory participation metric cache comprises a key-value store, each participant of the plurality of participants having one or more associated keys, each associated key corresponding to the participant and a participation metric;

in response to a null result from the in-memory participation metric cache, determine a first layout of the plurality of participants;

output first instructions to cause the client device to display the first layout of the plurality of participants;

receive one or more signals from a subset of the plurality of participants, including a first signal from a first participant;

determine, for the subset of the plurality of participants, one or more participation metrics including at least one participation metric for the first participant, based on the one or more received signals;

store, in the in-memory participation metric cache, the determined one or more participation metrics for the subset of the plurality of participants using one or more keys, each key identifying a participant of the plurality of participants and a participation metric of the determined one or more participation metrics;

determine a second layout of the plurality of participants, including an arrangement of the subset of the plurality of participants based on the one or more participation metrics; and output second instructions to cause the client device to display the second layout of the plurality of participants.

17. The non-transitory computer-readable medium of claim 16, further comprising instructions to:

receive a second signal from a second participant;

determine one or more participation metrics for the second participant, wherein at least one participation metric for the second participant is based on the second signal;

responsive to comparing the participation metrics for the subset of the plurality of participants, determine a third layout of the plurality of participants, wherein the relative layout of the first and second participants is based on comparing the participation metrics based on the first signal and the second signal;

output third instructions to cause the client device to display the third layout of the plurality of participants, wherein the third layout includes three rows, including a top row, a middle row, and bottom row, wherein the top row has a first size, the middle row has a second size, and the bottom row has a third size, wherein:

the third size is larger than the second size;

the second size is larger than the first size; and based on comparing at least one participation metric of the first participant to at least one participation metric of the second participant, the first participant is in the bottom row and the second participant is in the middle row.

18. The non-transitory computer-readable medium of claim 16, wherein the one or more participation metrics includes a first participation metric, the first participation metric including a weighted, arithmetic combination of one or more values derived from the first signal.

19. A system comprising:

a client device, the client device comprising one or more processors configured to:

query an in-memory participation metric cache using information about a plurality of participants, the plurality of participants using a plurality of client devices for participating in a video conference hosted by a video conference provider, the plurality of client devices comprising the client device, wherein the in-memory participation metric cache comprises a key-value store, each participant of the plurality of participants having one or more associated keys, each associated key corresponding to the participant and a participation metric;

in response to a null result from the in-memory participation metric cache, determine a first layout of the plurality of participants;

output first instructions to cause the first layout of the plurality of participants to display;

receive one or more signals from a subset of the plurality of participants, including a first signal from a first participant;

determine, for the subset of the plurality of participants, one or more participation metrics including at least one participation metric for the first participant, based on the one or more received signals;

store, in the in-memory participation metric cache, the determined one or more participation metrics for the subset of the plurality of participants using one or more keys, each key identifying a participant of the plurality of participants and a participation metric of the determined one or more participation metrics;

determine a second layout of the plurality of participants, including an arrangement of the subset of the plurality of participants based on the one or more participation metrics; and output second instructions to cause the second layout of the plurality of participants to display.

20. The system of claim 19, wherein the one or more processors are further configured to:

receive a second signal from the first participant, wherein the one or more participation metrics includes a first participation metric, the first participation metric including a weighted, arithmetic combination of one or more values derived from the first signal and the second signal.

* * * * *